(12) United States Patent
Kazmi et al.

(10) Patent No.: US 9,066,276 B2
(45) Date of Patent: Jun. 23, 2015

(54) CONTROLLING RADIO EMISSION FROM A MOBILE TERMINAL IN A CRITICAL AREA

(75) Inventors: Muhammad Kazmi, Bromma (SE); Gabor Fodor, Hässelby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1041 days.

(21) Appl. No.: 13/139,754

(22) PCT Filed: Dec. 17, 2008

(86) PCT No.: PCT/SE2008/051478
§ 371 (c)(1),
(2), (4) Date: Jun. 15, 2011

(87) PCT Pub. No.: WO2010/071509
PCT Pub. Date: Jun. 24, 2010

(65) Prior Publication Data
US 2011/0256884 A1    Oct. 20, 2011

(51) Int. Cl.
*H04W 48/04* (2009.01)
*H04W 52/36* (2009.01)
(Continued)

(52) U.S. Cl.
CPC ............ *H04W 48/04* (2013.01); *H04W 52/146* (2013.01); *H04W 52/367* (2013.01); *H04W 72/04* (2013.01)

(58) Field of Classification Search
CPC ............... H04L 1/00; H04L 1/16; H04L 1/18; H04L 12/5865; H04W 48/04; H04W 16/14; H04W 84/047; H04W 92/04; H04W 92/20; H04W 12/08; H04W 48/18; H04W 52/367; H04W 84/045; H04W 8/16; H04M 1/72572; H04M 1/72577

USPC .................... 455/456.1, 531, 442, 522, 67.11
See application file for complete search history.

(56) References Cited

U.S. PATENT DOCUMENTS 6,643,517 B1    11/2003   Steer
6,832,093 B1    12/2004   Ranta
(Continued)

FOREIGN PATENT DOCUMENTS

GB          2350022 A    * 11/2000

OTHER PUBLICATIONS

European Telecommunications Standards Institute. ETSI TS 125 321, V8.3.0 (Oct. 2008). Universal Mobile Telecommunications System (UMTS); Medium Access Control (MAC) protocol specification (3GPP TS 25.321 version 8.3.0 Release 8). Oct. 2008.

*Primary Examiner* — Nizar Sivji
(74) *Attorney, Agent, or Firm* — Coats & Bennett, P.L.L.C.

(57) ABSTRACT

Methods and arrangements (400, 600) in network nodes (101, 102, 110) for controlling radio emission from a mobile terminal (102) are provided. The mobile terminal (102) is located in a critical area. The network node sends a location parameter of the critical area, wherein the location parameter indicates a geographical location of the critical area. The first radio network node (101, 110) sends a first set of control parameters to the mobile terminal. The mobile terminal determines a geographical location of the mobile terminal and controls radio emission from the mobile terminal based on the first set of control parameters, the location parameter and the geographical location of the mobile terminal. Methods and arrangements (900) in a first radio network node (101, 110) for performing admission control are provided. The first radio network node (101, 110) receives a service request. In another step, the first radio network node (101, 110) denies the service request if an aggregated number of mobile terminals attached to the first radio network node (101, 110) exceeds a predetermined mobile terminal number or total received power at the first radio network node exceeds a predetermined threshold.

19 Claims, 6 Drawing Sheets

(51) Int. Cl.
*H04W 52/14* (2009.01)
*H04W 72/04* (2009.01)

(56) References Cited

U.S. PATENT DOCUMENTS

| | | |
|---|---|---|
| 6,944,449 B1 | 9/2005 | Gandhi et al. |
| 7,120,115 B1 | 10/2006 | Laaksonen |
| 8,626,155 B2 * | 1/2014 | Rune et al. ................ 455/432.1 |
| 2003/0202490 A1 | 10/2003 | Gunnarsson et al. |
| 2004/0053622 A1 | 3/2004 | Nakakita et al. |
| 2004/0219920 A1 | 11/2004 | Love et al. |
| 2008/0031212 A1 | 2/2008 | Ogura |
| 2008/0176575 A1 | 7/2008 | Sutton |
| 2008/0267114 A1 * | 10/2008 | Mukherjee et al. ........... 370/315 |

* cited by examiner

CONTROLLING RADIO EMISSION FROM A MOBILE TERMINAL IN A CRITICAL AREA

TECHNICAL FIELD

The present invention relates to methods and arrangements in a telecommunication system for ensuring safety or security when a mobile terminal is present in a critical situation. In particular, the present invention relates to a method and an arrangement in a first radio network node for controlling radio emission from a mobile terminal, a method and an arrangement in a mobile terminal for controlling radio emission from the mobile terminal, and a method and an arrangement in a radio communication network node for determining a ranking parameter for a radio access technology. Moreover, the present invention relates to methods and arrangements in a first radio network node for performing admission control.

BACKGROUND

Currently, users are able to use their mobile terminals in a variety of private and public locations such as airports, shopping malls, hospitals, conference facilities, trains etc., thanks to extensive coverage of wireless communication networks. However, depending upon particular circumstances, relating to a location and/or a time the mobile terminal is to be used, the use of the mobile terminal could be hazardous, at least temporarily, due to interaction with sensitive (site specific) electronic equipment. Therefore, there is a need for a mechanism, which in a critical situation or in a critical area allows the wireless communication network to dynamically switch off or limit radio emission from the mobile terminals, i.e. the transmitter thereof, such that site specific safety requirements are met.

In the following a few examples of critical situations are described. A reason for defining a critical situation or critical area may be that there is a high risk for adversely affecting some electronic equipment due to an actively transmitting mobile terminal. Thereby, potentially leading to some sort of accident or hazard. Another reason is different kinds of security threats or risks, which would apply in military or civil defense zones or the like. Within this invention disclosure all those scenarios, which are prone to accident or security risk due to mobile terminals actively transmitting information, are altogether termed as critical scenarios. Some well known examples of critical scenarios are take-off and landing of aircrafts, vicinity of operation theatres, military installations, nuclear power plants, sensitive government location and intelligence agencies and vicinity of immigration counters at port of entry.

In some form the use of mobile terminal is urged to be avoided in many of the above mentioned scenarios. Despite illustrious sign boards or repeated announcements forbidding the use of mobile terminals, the mobile terminals are inevitably used by some users. Irresponsible behavior of some of these users is not always the sole cause of not restricting use of the mobile terminal. Indeed such indications, announcements or messages, clearly forbidding the use of mobile phones, could be missed due to carelessness or sometimes due to medical disability (e.g. visual impairment) of some of the users. In a near future, onboard mobile operation will start allowing on-the-flight communication. Nevertheless, there may still be occasions when the transmitter of the mobile terminal should be turned off immediately.

Although mobile terminals typically operate in a well defined portion of the frequency band, emissions outside its operating bandwidth and band are unavoidable. Therefore, mobile terminals, as well as base stations, have to fulfill certain out of band (OOB) emission requirements. An objective of OOB emission requirements is to limit the interference caused by the transmitter (mobile terminal or base station) outside their respective operating bandwidths to adjacent carriers. In fact, all wireless communication standards (e.g. GSM, UTRAN, E-UTRAN, WLAN etc), clearly specify the OOB emission requirements to limit or at least reduce unwanted out of band emission. Out of band emission requirements as imposed by standard bodies of different countries or regions typically comprise maximum allowed levels of Adjacent Channel Leakage Ratio (ACLR), Spectrum Emission Mask (SEM) and spurious emissions. The specific definition and requirement level of these requirements may vary from one radio communication system to another. OOB emission levels tends to decay dramatically the further away from an operating band one moves, but the emission levels in adjacent frequency ranges are at least sometimes not completely eliminated.

Requirements for base stations are generally much tighter than those stipulated for mobile terminals. The reason is that a base station can afford to have more complex and sophisticated cut-off filters to suppress unwanted out of band emission. Furthermore, base stations operate at high output power. As a consequence, more relative suppression is needed compared to that of mobile terminals. For an UTRA mobile terminal and UTRA base stations, the OOB emission requirements are specified in TS 25.101 and TS 25.104, respectively. For E-UTRA mobile terminals and E-UTRA base stations, the OOB requirements are specified in TS 36.101 and TS 36.104, respectively. Depending upon the type, nature and frequency of operation of particular electronic equipment even a low level out of band emissions could have harmful effects in some situations. For instance, the reliability of aircraft navigational or medical devices, which generally require very high level of precision, could be adversely affected. Furthermore, transmitters of mobile terminals are typically more hazardous than those of base stations, since the latter is generally not installed (or located) in close proximity to a sensitive location or a critical situation (e.g. hospital etc). Secondly, as mentioned above, OOB emission requirements for base stations are much stricter than those for mobile terminals. Thus, in general, the impact of out of band emission due to base station on electronic equipment is lower than the impact of out of band emission due to mobile terminals. Notably, a mobile terminal may be located very close to a critical situation. Thereby, significant harm to the equipment may be caused. Furthermore, a plurality of mobile terminals may operate in the vicinity of sensitive electronic equipment. As a result, the adverse effects on sensitive electronic equipment from each mobile terminal may be enhanced.

By multimode mobile terminals, it is within this disclosure referred to mobile terminals supporting more than one band per radio access technology (multi-band) and/or supporting more than one radio access technology (multi-RAT). Today most mobile terminals are multimode enabled, which means they support more than one radio access technology and more than one frequency band per radio access technology. This is further elaborated below.

Most of the mobile terminals on the market support multiple bands even for the same radio access technology. A well known example is that of multi-band GSM terminal with 800/900/1800/1900 bands ensuring almost universal operation (i.e. in US, Europe, Asia and other regions). Tables 1 and 2 below give an overview of the frequency bands, which are currently standardized for UTRA FDD and E-UTRA, respectively.

TABLE 1

UTRA FDD frequency bands [1-2]

| Operating Band | UL Frequencies UE transmit, Node B receive | DL frequencies UE receive, Node B transmit |
|---|---|---|
| I | 1920-1980 MHz | 2110-2170 MHz |
| II | 1850-1910 MHz | 1930-1990 MHz |
| III | 1710-1785 MHz | 1805-1880 MHz |
| IV | 1710-1755 MHz | 2110-2155 MHz |
| V | 824-849 MHz | 869-894 MHz |
| VI | 830-840 MHz | 875-885 MHz |
| VII | 2500-2570 MHz | 2620-2690 MHz |
| VIII | 880-915 MHz | 925-960 MHz |
| IX | 1749.9-1784.9 MHz | 1844.9-1879.9 MHz |
| X | 1710-1770 MHz | 2110-2170 MHz |
| XI | 1427.9-1452.9 MHz | 1475.9-1500.9 MHz |
| XII | 698-716 MHz | 728-746 MHz |
| XIII | 777-787 MHz | 746-756 MHz |
| XIV | 788-798 MHz | 758-768 MHz |

TABLE 2

E-UTRA frequency bands [3-4]

| E-UTRA Band | Uplink (UL) eNode B receive UE transmit $F_{UL\,low}$-$F_{UL\,high}$ | Downlink (DL) eNode B transmit UE receive $F_{DL\,low}$-$F_{DL\,high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1452.9 MHz | 1475.9 MHz-1500.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 17 | 704 MHz-716 MHz | 734 MHz-746 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |

A typical multi-RAT mobile terminal supports multiple GSM and WCDMA. According to E-UTRAN standard a multi-RAT UE may support one or more of the following technologies: E-UTRAN FDD, E-UTRAN TDD, UTRAN FDD (WCDMA), UTRAN TDD, GSM, cdma2000 1x RTT and HRPD. A typical multi-RAT mobile terminal would largely depend upon market demand and network deployment scenarios.

The popularity of services allowing a position of the mobile terminal to be determined is on the rise. Furthermore, for safety purposes, mobile positioning is gradually becoming mandatory in several parts of the world. Several methods are in fact already standardized and could be used for positioning in mobile communication. Some well-known examples are satellite based positioning, fingerprinting, time of arrival based method, etc.

A fundamental solution, ensuring that electrical equipment in critical situations are not severely affected by emission from a mobile terminal in the vicinity thereof, is to manually switch off the mobile terminal. However, this cannot be guaranteed for all users, or mobile terminals, in all circumstances. Furthermore, smart phones, which are utilized for various other purposes, could not be used at all if completely turned off. On the market, there exist mobile terminals which allow the user to manually switch off the radio transmitter of the mobile terminal. In this manner, users may still use features of the mobile terminal, such as playing (local) games or managing calendars, since these features do not require the radio transceivers of the mobile terminal to be active. This solution does, however, not guarantee that emission from the mobile terminal is restricted, as conscious human interaction is required, which for obvious reasons can not always be assured.

In EP1052864, there is disclosed a method for controlling a mobile terminal. The mobile terminal receives mode change information for protecting a predetermined area, e.g. airplanes, hospitals or the like from disturbing use of the mobile terminal. When receiving such mode change information, the mobile terminal changes to a protection mode, in which at least the high frequency portion of the mobile terminal is switched off so that interference with other electronic systems within the predetermined area to be protected is avoided.

SUMMARY

An object of the present invention is to provide methods and arrangements for handling a mobile terminal present in a critical situation, such as when safety or security may be endangered due to medical equipment or the like is exposed to radio emission from the mobile terminal.

According to an aspect of the invention, the object is achieved by a method in a first radio network node for controlling radio emission from a mobile terminal. The mobile terminal is located in a critical area in which radio emission from the mobile terminal is to be at least partly reduced. A radio communication system comprises the network node and the mobile terminal. The network node sends a location parameter of the critical area to the mobile terminal, wherein the critical area has a geographical location and the location parameter indicates the geographical location of the critical area. Then, the network node sends a first set of control parameters to the mobile terminal. The first set of control parameters comprises one or more of the following parameters at least one radio access technology parameter indicating a radio access technology for which operation of the mobile terminal is restricted, at least one data rate parameter indicating a maximum data rate at which the mobile terminal is allowed to transmit, at least one transport block size parameter indicating at least one transport block size, which the mobile terminal is allowed to use in an uplink transmission, at least one modulation scheme parameter indicating at least one modulation scheme, which the mobile terminal is allowed to use in an uplink transmission, an activation probability parameter indicating a probability with which the mobile terminal is allowed to activate its transmitter, and a ranking parameter indicating a measure of restrictions applicable for a radio access technology.

Furthermore, the location parameter and the first set of control parameters are useable by the mobile terminal for controlling radio emission there from.

According to another aspect of the invention, the object is achieved by an arrangement in a first radio network node for controlling radio emission from a mobile terminal. The mobile terminal is located in a critical area in which radio emission from the mobile terminal is to be at least partly reduced. A radio communication system is arranged to comprise the first radio network node and the mobile terminal. Furthermore, the arrangement comprises a sending unit configured to send a location parameter of the critical area to the mobile terminal. The critical area has a geographical location and the location parameter indicates the geographical location of the critical area. Moreover, the sending unit is further configured to send a first set of control parameters to the mobile terminal. The first set of control parameters comprises one or more of the following parameters at least one radio access technology parameter indicating a radio access technology for which operation of the mobile terminal is restricted, at least one data rate parameter indicating a maximum data rate at which the mobile terminal is allowed to transmit, at least one transport block size parameter indicating at least one transport block size, which the mobile terminal is allowed to use in an uplink transmission, at least one modulation scheme parameter indicating at least one modulation scheme, which the mobile terminal is allowed to use in an uplink transmission, an activation probability parameter indicating a probability with which the mobile terminal is allowed to activate its transmitter, and a ranking parameter indicating a measure of restrictions applicable for a radio access technology.

Further, the location parameter and the first set of control parameters are useable by the mobile terminal for controlling radio emission therefrom.

According to yet another aspect of the invention, the object is achieved by a method in a mobile terminal for controlling radio emission from the mobile terminal. A radio communication system comprises the mobile terminal and a network node. In a step, the mobile terminal receives a location parameter of a critical area from the network node, wherein the critical area has a geographical location and the location parameter indicates the geographical location of the critical area. Then, the mobile terminal receives a first set of control parameters from the network node. The first set of control parameters comprises one or more of the following parameters at least one radio access technology parameter indicating a radio access technology for which operation of the mobile terminal is restricted, at least one data rate parameter indicating a maximum data rate at which the mobile terminal is allowed to transmit, at least one transport block size parameter indicating at least one transport block size, which the mobile terminal is allowed to use in an uplink transmission, at least one modulation scheme parameter indicating at least one modulation scheme, which the mobile terminal is allowed to use in an uplink transmission, an activation probability parameter indicating a probability with which the mobile terminal is allowed to activate its transmitter, and a ranking parameter indicating a measure of restrictions applicable for a radio access technology.

Further, the mobile terminal determines a geographical location of the mobile terminal and controls radio emission from the mobile terminal based on the first set of control parameters, the location parameter and the geographical location of the mobile terminal.

According to a further aspect of the invention, the object is achieved by an arrangement in the mobile terminal for controlling radio emission from the mobile terminal. A radio communication system is arranged to comprise the mobile terminal and a network node. The arrangement comprises a receiving unit configured to receive a location parameter of a critical area from the network node. The critical area has a geographical location and the location parameter indicates the geographical location of the critical area. Moreover, the receiving unit is further configured to receive a first set of control parameters from the network node. The first set of control parameters comprises one or more of the following parameters at least one radio access technology parameter indicating a radio access technology for which operation of the mobile terminal is restricted, at least one data rate parameter indicating a maximum data rate at which the mobile terminal is allowed to transmit, at least one transport block size parameter indicating at least one transport block size, which the mobile terminal is allowed to use in an uplink transmission, at least one modulation scheme parameter indicating at least one modulation scheme, which the mobile terminal is allowed to use in an uplink transmission, an activation probability parameter indicating a probability with which the mobile terminal is allowed to activate its transmitter, and a ranking parameter indicating a measure of restrictions applicable for a radio access technology.

Furthermore, the arrangement comprises a processing unit configured to determine a geographical location of the mobile terminal. The processing unit is further configured to control radio emission from the mobile terminal based on the first set of control parameters, the location parameter and the geographical location of the mobile terminal.

According to still another aspect of the invention, the object is achieved by a method in a radio network node for determining a ranking parameter. The ranking parameter defines a measure for a radio access technology, the measure being indicative of restrictions, applicable to the radio access technology, as defined by a critical area. In a step, the radio network node determines the ranking parameter based on a third set of control parameters. The third set of control parameters comprises one or more of the following parameters at least one data rate parameter indicating a maximum data rate at which the mobile terminal is allowed to transmit, at least one transport block size parameter indicating at least one transport block size, which the mobile terminal is allowed to use in an uplink transmission, at least one modulation scheme parameter indicating at least one modulation scheme, which the mobile terminal is allowed to use in an uplink transmission, an activation probability parameter indicating a probability with which the mobile terminal is allowed to activate its transmitter, a transmission power parameter indicating a maximum allowed transmission power, a frequency band parameter indicating an allowed frequency band, a carrier parameter indicating an allowed sub-set of carrier frequencies, a time period parameter indicating a time period during which the radio emission is to be reduced, and a service type parameter, indicating a type of service such as a voice, video or data service.

According to a still further aspect of the invention, the object is achieved by an arrangement in a radio network node for determining a ranking parameter. The ranking parameter defines a measure for a radio access technology, the measure being indicative of restrictions, applicable to the radio access technology, as defined by a critical area. The arrangement comprises a determining unit configured to determine the ranking parameter based on a third set of control parameters. The third set of control parameters comprises one or more of the following parameters at least one data rate parameter indicating a maximum data rate at which the mobile terminal is allowed to transmit,
at least one transport block size parameter indicating at least one transport block size, which the mobile terminal is allowed to use in an uplink transmission,
at least one modulation scheme parameter indicating at least one modulation scheme, which the mobile terminal is allowed to use in an uplink transmission,
an activation probability parameter indicating a probability with which the mobile terminal is allowed to activate its transmitter,
a transmission power parameter indicating a maximum allowed transmission power,
a frequency band parameter indicating an allowed frequency band,
a carrier parameter indicating an allowed sub-set of carrier frequencies,
a time period parameter indicating a time period during which the radio emission is to be reduced, and
a service type parameter, indicating a type of service such as a voice, video or data service.

According to a yet further aspect of the invention, the object is achieved by a method in a first radio network node for performing admission control. A radio communication system comprises the first radio network node and a mobile terminal. In a step, the first network node receives a service request from the mobile terminal. In another step, the first network node denies the service request if total received power at the first radio network node exceeds a predetermined threshold, the total received power comprising an aggregated received power from mobile terminals attached to the first radio network node. The predetermined threshold is based on conditions defined by the critical area.

According to yet another aspect of the invention, the object is achieved by an arrangement in a first radio network node for performing admission control. A radio communication system comprises the first radio network node and a mobile terminal. The arrangement comprises a receiving unit configured to receive a service request from the mobile terminal, and a processing unit configured to deny the service request if total received power at the first radio network node exceeds a predetermined threshold, the total received power comprising an aggregated received power from mobile terminals attached to the first radio network node. The predetermined threshold is based on conditions defined by the critical area.

According to still another aspect of the invention, the object is achieved by a method in a first radio network node for performing admission control. A radio communication system comprises the first radio network node and a mobile terminal. In a step, the first radio network node receives a service request from a mobile terminal. In another step, the first radio network node denies the service request if an aggregated number of mobile terminals attached to the first radio network node exceeds a predetermined mobile terminal number. The predetermined mobile terminal number is based on conditions defined by the critical area.

According to a still further aspect of the invention, the object is achieved by an arrangement in a first radio network node for performing admission control. A radio communication system comprises the first radio network node and a mobile terminal. The arrangement comprises a receiving unit configured to receive a service request from the mobile terminal, and a processing unit configured to deny the service request if an aggregated number of mobile terminals attached to the first radio network node exceeds a predetermined mobile terminal number. The predetermined mobile terminal number is based on conditions defined by the critical area.

An idea of the invention is to reduce radio emission from a mobile terminal when it is located in a critical situation, in which safety and security are at risk due to radio emission therefrom. A radio communication system sends one or more parameters to the mobile terminals within reach. The mobile terminal uses the sent parameters to either fully or partially restrict its operation. The parameters comprise at least one radio access technology parameter indicating a radio access technology for which operation of the mobile terminal is restricted, at least one data rate parameter indicating a maximum data rate at which the mobile terminal is allowed to transmit, at least one transport block size parameter indicating at least one transport block size, which the mobile terminal is allowed to use in an uplink transmission, at least one modulation scheme parameter indicating at least one modulation scheme, which the mobile terminal is allowed to use in an uplink transmission, and an activation probability parameter indicating a probability with which the mobile terminal is allowed to activate its transmitter.

Since one or more of at least one radio access technology parameter indicating a radio access technology for which operation of the mobile terminal is restricted, at least one data rate parameter indicating a maximum data rate at which the mobile terminal is allowed to transmit, at least one transport block size parameter indicating at least one transport block size, which the mobile terminal is allowed to use in an uplink transmission, at least one modulation scheme parameter indicating at least one modulation scheme, which the mobile terminal is allowed to use in an uplink transmission, and an activation probability parameter indicating a probability with which the mobile terminal is allowed to activate its transmitter, provide information about how the mobile terminal may be operated with respect to a critical area, the mobile terminal may be controlled by the network node such that radio emission from the mobile terminal is restricted when the mobile terminal is present in a critical situation. As a result, the above mentioned object is achieved.

Advantageously, embodiments of the present invention provides means for enabling automatic shut off of transmitters in mobile terminals when present in a critical situation. In this manner, safety and security are ensured.

Furthermore, an advantage of embodiments of the present invention is that a service is only disabled in a very limited area in the vicinity of the critical area rather than in an entire area of a cell.

Moreover, only the frequency bands that potentially emit power to a particular out of band region are affected in embodiments of the present invention. In this manner, the mobile terminal may continue to transmit in frequency bands not being harmful to the critical situation.

A further advantage of embodiments of the present invention is that a finer granularity of limiting the transmission from a mobile terminal, as compared to on-off operation, is provided.

In embodiments of the present invention, the mobile terminal may beneficially select the radio access technology that provides the best quality of service under specific constraints as given by a critical situation (as defined by the parameters listed above).

Additionally, in embodiments of the present invention, restriction of radio emission from the mobile terminal should on one hand ensure safety of sensitive equipment, which defines a critical situation, but on the other hand unnecessary restriction of radio emission from the mobile terminal should be avoided to prevent degradation of services operated in the mobile terminal. The present invention provides, as disclose within the present application, several options on how to solve this problem by selectively restrict radio emission from the mobile terminal when present in a critical situation.

A further idea of the invention is determine a ranking parameter for a radio access technology. The ranking parameter may be used by a radio network node for selecting one radio access technology among a set of radio access technologies, wherein the ranking parameter indicates that the selected radio access technology may be beneficial to with regard to one or more of the following parameters: at least one data rate parameter indicating a maximum data rate at which the mobile terminal is allowed to transmit, at least one transport block size parameter indicating at least one transport block size, which the mobile terminal is allowed to use in an uplink transmission, at least one modulation scheme parameter indicating at least one modulation scheme, which the mobile terminal is allowed to use in an uplink transmission, an activation probability parameter indicating a probability with which the mobile terminal is allowed to activate its transmitter, a transmission power parameter indicating a maximum allowed transmission power, a frequency band parameter indicating an allowed frequency band, a carrier parameter indicating an allowed sub-set of carrier frequencies, and a time period parameter indicating a time period during which the radio emission is to be reduced. The radio communication network node may be a mobile terminal or a core network node, such as a mobility management entity, a radio base station, a radio base station controller or the like. When the radio communication network node is a mobile terminal, the mobile terminal may select, while taking into account the ranking parameters for a set of radio access technologies, which radio access technology to use when sending information to the network. In this manner, the mobile terminal may select a radio access technology for which a ranking parameter indicates that the selected radio access technology is preferred to use. Moreover, when the radio communication network node is a first radio network node, such as a core network node or a radio base station node, the ranking parameter may be used in an admission control procedure.

A still further idea of the present invention is to provide methods for performing admission control, wherein the methods for performing admission control take into account a critical situation (or a critical area), which define restrictions with regard to radio emission from a mobile terminal. Safety or security of the critical situation is ensured by the first network node by denying a service request from the mobile terminal if total received power at the first radio network node exceeds a predetermined threshold, and/or if an aggregated number of mobile terminals attached to the first radio network node exceeds a predetermined mobile terminal number. The predetermined threshold and/or the predetermined mobile terminal number is/are based on conditions defined by the critical area. In this manner, methods and arrangements for handling a mobile terminal in a critical situation is provided.

Since the service request from the mobile terminal may be denied based on a predetermined threshold, defining an allowed radio emission power received from mobile terminals attached to the first radio network node, sets a limit for aggregated radio emission from the mobile terminals, it is assured that total radio emission from the mobile terminals is less than the predetermined threshold, which is defined by a critical situation. As a result, safety or security of the equipment of the critical situation is achieved.

Since the service request from the mobile terminal may be denied based on a predetermined number of mobile terminals being attached to the first radio network node, aggregated radio emission from the mobile terminals may be reduced as compared to when there is no restriction on the number of mobile terminals being allowed to attach to the first radio network node. It may be noted that radio emission from, for example, ten mobile terminals on an average is less than radio emission from, for example, one hundred mobile terminals. As a result, conditions defined by a critical situation may be fulfilled. The advantage of the above admission control procedure is that the total number of active mobile terminals, which are transmitting in the uplink, may be kept below a certain limit. This limit will ensure that aggregated emission from the mobile terminals operating in a cell is below the allowed emission level in the nearby critical area.

Further features of, and advantages with, the present invention will become apparent when studying the appended claims and the following description. Those skilled in the art realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
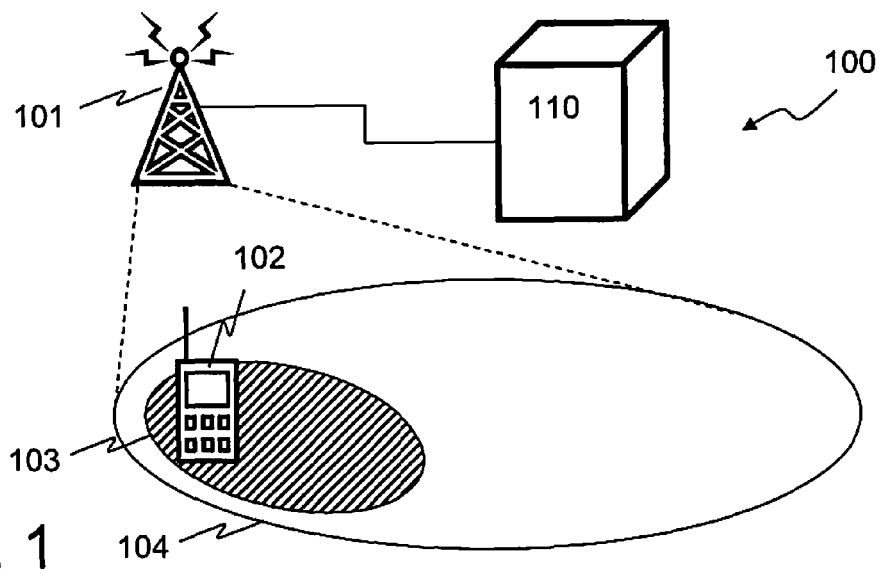
FIG. 1 shows a schematic overview of an exemplifying radio communication system in which the present solution may be implemented.

Throughout the following description similar reference numerals have been used to denote similar elements, parts, items or features, when applicable.

FIG. 1 shows a schematic overview of an exemplifying radio communication system 100 in which the present solution may be implemented. The radio communication system 100 comprises a first radio network node 101, 110. The first radio network node may comprise a core network node 110, such as a Mobility Management Entity or the like, a radio base station network node 101, such as a radio base station. Moreover, the radio communication system 100 comprises a mobile terminal 102. The mobile terminal 102 may be a cellular phone, a PDA, a mobile station, a user equipment or the like. The core network node 110 manages the radio base station network node 101. The radio base station network node 101 serves a cell 104. Within (or at least partly within) the cell 104 a critical situation 103 or a critical area 103 is defined due to for example sensitive, medical electronic equipment. The mobile terminal 102 is located within the critical area 103 or the critical scenario 103 and is comprised in the radio communication system 100.

It may be noted that the first radio network node may be a core network node, a Mobility Management Entity, a radio base station network node, a radio base station, a radio network controller, a home base station, a base station controller, home subscriber systems or the like throughout this disclosure.

Figure 2:
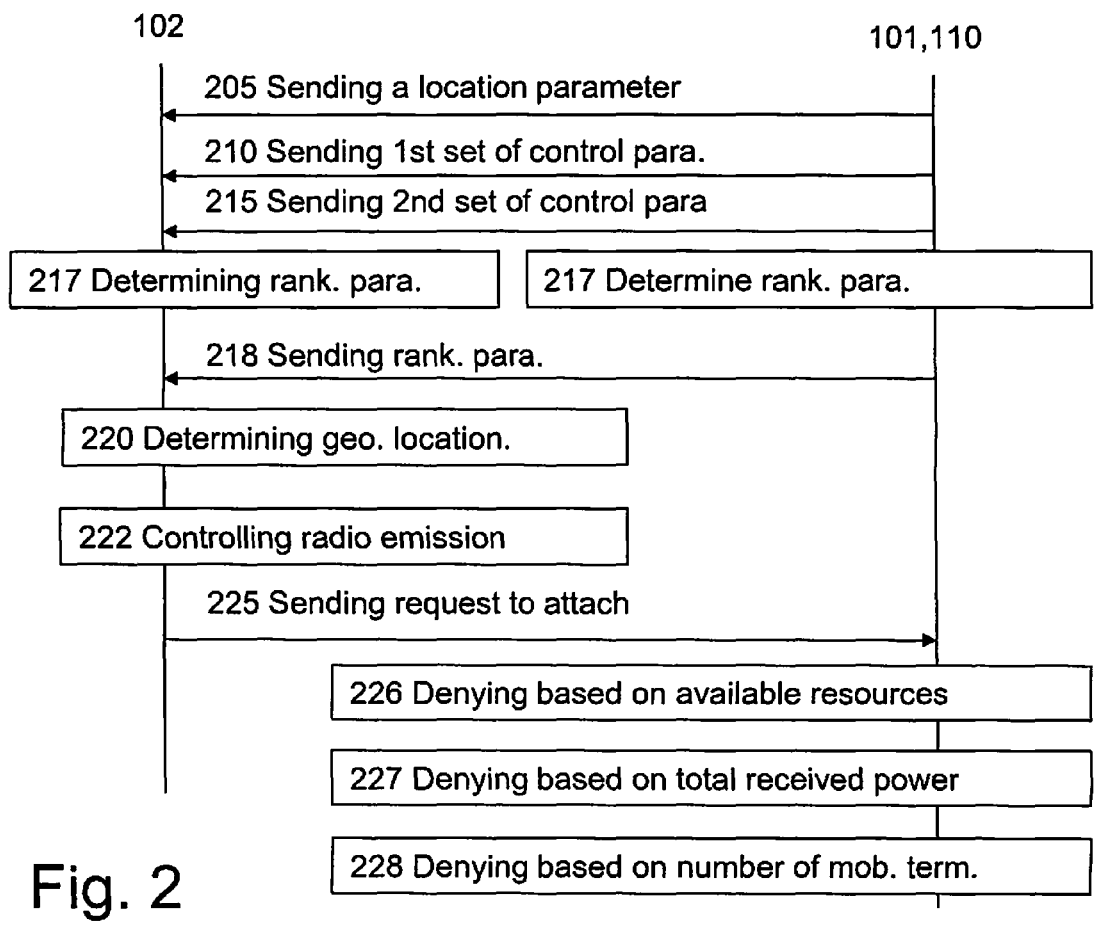
FIG. 2 shows a schematic, combined signalling and flow chart of an embodiment of a method in the radio communication system according to FIG. 1 for controlling radio emission from a mobile terminal comprised in the radio communication system.

With reference to FIG. 2, there is shown an exemplifying method in the radio communication system 100 according to FIG. 1 for controlling radio emission from the mobile terminal 102. The following steps may be performed.

205 In a step 205, the first radio network node 101, 110 sends a location parameter of the critical area to the mobile terminal (102), wherein the critical area has a geographical location and the location parameter indicates the geographical location of the critical area. The location parameter needs to be sent by all networks nodes, which are close to the critical location. Moreover, in a cell there may be more than one location where there is a so called critical situation. For instance, two hospitals may be located under the coverage of the only one cell. In this case, the location parameter may comprise information about all sensitive locations, in which the mobile terminal needs to be turned off or operation thereof needs to be reduced.

210 In a step 210, the first radio network node 101, 110 sends a first set of control parameters to the mobile terminal 102, wherein the first set of control parameters comprises one or more of the following parameters

- at least one radio access technology parameter indicating a radio access technology for which operation of the mobile terminal 102 is restricted,
- at least one data rate parameter indicating a maximum data rate at which the mobile terminal 102 is allowed to transmit,
- at least one transport block size (TB size) parameter indicating at least one transport block size, which the mobile terminal 102 is allowed to use in an uplink transmission,
- at least one modulation scheme parameter indicating at least one modulation scheme, which the mobile terminal 102 is allowed to use in an uplink transmission,
- an activation probability parameter indicating a probability with which the mobile terminal 102 is allowed to activate its transmitter, and
- a ranking parameter indicating a measure of restrictions applicable for a radio access technology, wherein the location parameter and the first set of control parameters are useable by the mobile terminal 102 for controlling, or adjusting, radio emission therefrom.

220 In a step 220, the mobile terminal determines a geographical location of the mobile terminal (102), 222 In a step 222, the mobile terminal 102 controls, or regulates, radio emission from the mobile terminal based on the first set of control parameters, the location parameter and the geographical location of the mobile terminal (102). Expressed differently, the mobile terminal 102 adjusts radio emission from the mobile terminal according to the first set of control parameters.

When a critical situation ceases or is reduced in some way or other, the first radio network node no longer sends control parameters which are set such that the radio emission from the mobile terminal is restricted. Thus, the mobile terminal returns to full operation.

The network nodes, such as the first radio network node, radio base stations, radio network controller, home base station, base station controller, mobility management entities or home subscriber systems (HSS) or the like, are to be provided and configured with up-to-date critical information in order to be able to send control parameters to the mobile terminals. An operator would avoid unnecessarily barring users from using their services as this will affect their reputation and may cause loss in revenues and chum. In some installations, such as airports and medical locations, the activities might decrease during certain time of the day. Thus, preferably the control parameters need to be updated on a dynamic or at least semi-dynamic basis. However, the location parameter (e.g. coordinates of a critical situation) is fairly static, which is less likely to change frequently. Thus, the location parameter could be updated via an operation and management system when new critical areas are created or dismantled.

It is therefore more efficient to have means, which directly and dynamically provides the control parameters to the radio communication system. Nowadays, the tasks and activities even at small private or state owned installations are highly automated and computerized. Thus, a monitoring device, which keeps track of the schedule of various activities at locations like airport, operation theatres etc., could indicate via a commonly used cable communication link to all the surrounding mobile operators as to when the use of transmitter of mobile terminals in their vicinity should be forbidden or at least restricted. The radio communication system may translate this information into control parameters, duration and location parameters, whereby updated control parameters may be send to the mobile terminals. Optionally, the control parameters may be updated by the operation and management systems or manually.

The first set of control parameters sent is immediately processed by the mobile terminal. The underlying assumption is that the mobile terminal has means to determine its physical position by a suitable location method. Thus, if the transmitter of the mobile terminal is required to be switched off or if its use is supposed to be restricted as indicated by the first set of control parameters, the mobile terminal will compare the location parameter with its determined position. If they match, then the transmitter of the mobile terminal is immediately turned off (in certain bands or RATs) or the transmitter will be restricted if it was previously active. If mobile terminal is not yet in critical zone, it will then store this information, continue the call, but keep on comparing its position with the location parameter sent from the network to ensure that the transmitter is turned off on arriving in that location. Obviously, the stored information is overridden by the latest received critical information.

The first radio network node may send information about the first set of control parameters. Optionally, each parameter may be different for different radio access technologies. Hence, if two radio access technology parameters are sent, then there may be two parameters for each of the data rate parameter, TB size parameter, modulation scheme parameter and activation probability parameter.

With reference to table 1 and 2 (in the background section), it may be noted that the frequency separation between the bands or the distance between the bands in frequency domain different bands may be very large. This means the sensitivity to the electronic equipment will be highly dependent upon the frequency band. For instance an electronic equipment operating in the vicinity of UTRA FDD band VII (2600 MHz) is likely to be insensitive to the out of band emissions due to UTRA FDD bands V, VI, XII, XIII or XIV. Furthermore, out of band emission requirements depend on the frequency band in addition to other factors. For instance, for UTRA FDD UE, the additional spectrum emission limits measured over 30 KHz are −15 dBm and −13 dBm for set of bands (II, IV, X, V) and (XII, XIII, XIV) respectively. This means the level of harmful interference caused by the mobile terminal is directly related to the its operating band. Thus, in some scenarios it might be sufficient to switch off only UE operation in certain bands.

It is important to note that the frequency borders of the particular frequency band that needs to be protected may be specific to the actual critical situation. For instance, different radio access technologies typically operate in different bands, though some of the bands may be overlapping. However, an operator will normally be using different bands for different radio access technologies (RATs) in the same coverage area. Thus, due to the different operating bands, the degree of vulnerability of particular electronic equipment (which defines a critical situation) would depend upon the type of radio access technology.

Furthermore, due to the differences in the physical layer properties and multiple access technologies between different radio access technologies, the impact of out of band emission on a piece of electronic equipment may also vary. Thus, in a particular critical situation, the mobile terminal should limit or switch off its transmission in the GSM band, while in another situation perhaps the WCDMA band must be "switched off". From the user perspective, it is obviously very advantageous if only some radio access technologies rather than the entire mobile terminal, or at least the transmitter thereof, must be switched off.

The control parameters sent by the network for enforcing reduction of emission when the UE is located in a critical situation are described below.

The radio access technology parameter restricts the use of one or more particular radio access technologies in critical situations. The mobile terminal will not be allowed to operate while using said one or more particular radio access technologies. As a result, a multi-RAT mobile terminal may still be able to operate in one or more unrestricted RATs.

For example, a mobile terminal supporting GSM/UTRAN FDD/E-UTRAN FDD may still operate in GSM or E-UTRAN FDD, if UTRAN FDD is restricted. Other combinations of access technologies which may be supported by a mobile terminal are: E-UTRAN FDD, E-UTRAN TDD, WCDMA, GSM or E-UTRAN FDD, E-UTRAN TDD, UTRAN TDD or E-UTRAN FDD, E-UTRAN TDD, cdma2000 1xRTT, HRPD. This embodiment may be preferred, since it is common to have multi-RAT mobile terminals due to the introduction of new access technologies. Furthermore, different technologies have different levels of out of band emission requirements. For instance, GSM has generally stricter out of band emission requirements compared to those of E-UTRAN. Possibly, the network may allow the use of GSM, but restrict the use of LTE, in critical situations. As an example, a frequency band or a first set of carriers may be restricted due to a critical situation, such as when a medical device uses the frequency band or the first set of carriers. If the frequency band or the first set of carriers is located adjacent to a second set of carriers assigned for mobile communication, it is more advantageous to restrict a particular radio access technology rather than an entire carrier (see also below). For instance, in such scenario E-UTRAN operation may be limited, but GSM operation may be allowed due to the fact that GSM, typically, causes lower emission levels due to relatively stricter out of band emission requirements. As an example, in some critical situations, some of the available radio access technologies (RATs) may be restricted in use, although they could still be allowed to be used with, for instance, restricted power. In such a situation, the mobile terminal actively takes into account the specific restrictions as defined by the control parameters for some radio access technologies and may hence continue its operation by means of some allowed radio access technology.

The data rate parameter indicates a maximum data rate at which the mobile terminal is allowed to transmit in a transmission time interval. For example, a mean bit rate may be specified. The mean bit rate will, normally, be less than the maximum possible data rate. Consequently, the mobile terminal will on an average operate at a lower transmission power. As a result, interference, possibly being harmful in a critical situation, will be reduced.

The transport block size parameter indicates at least one transport block size (TB size), which the mobile terminal is allowed to use in an uplink transmission. The transport block size parameter may be included in a transport format. Hence, a maximum allowed transport format parameter may be introduced. The maximum allowed transport format parameter indicates a format, which the mobile terminal (UE) is allowed to use for uplink transmission. The maximum allowed transport format parameter may normally be less than the maximum possible transport format. This parameter is valid for a UTRAN system, in which transport format selection is autonomously done by the UE within the maximum allowed transport format (TF). The maximum allowed transport format is enforced by the UTRAN network by signaling an index of the transport format. The transport format combination index (TFCI) and E-DCH TFCI (E-TFCI) represent the indices of the transport formats of DCH and E-DCH, respectively. Furthermore, this type of restriction could be independently applied to both DCH and E-DCH operations in UTRAN i.e. maximum allowed TFCI and E-TFC, respectively. A particular transport format, represented by TFCI or E-TFCI, maps to certain transport block size as defined by mapping tables in the standard, i.e. in TS 25.321 for UTRAN.

An example in table 3 illustrates the standardized mapping between E-TFCI and actual transport block size for E-DCH transmission in the UL; it is specified in TS 25.321[12]. For instance if network signals E-TFCI=10, then UE is not allowed to transmit using TB size greater than 726 bits. However it has full freedom to choose a suitable TB size between 18 and 726 bits.

In E-UTRAN similar tables are specified in TS 36.213[13] and also the index of the allocated TB size is sent to the UE. But unlike in UTRAN, in E-UTRAN the UE is strictly supposed to transmit using the TB size corresponding to the network sent index. Hence the network explicitly assigns the TB size for UL transmission by sending the exact index corresponding to the allowed TB size. This means in E-UTRAN when UE is found to be in restricted area, the TB size will be limited by also allocating an appropriate TB size.

TABLE 3

Example of mapping E-DCH Transport Block Size to the transport block index for 2 ms E-DCH TTI defined in TS 25.321 for UTRAN

| E-TFCI | TB Size (bits) |
|---|---|
| 0 | 18 |
| 1 | 186 |
| 2 | 204 |
| 3 | 354 |
| 4 | 372 |
| 5 | 522 |
| 6 | 540 |
| 7 | 674 |
| 8 | 690 |
| 9 | 708 |
| 10 | 726 |
| 11 | 858 |
| 12 | 876 |
| 13 | 1026 |
| 14 | 1044 |
| 15 | 1062 |
| 16 | 1194 |
| 17 | 1212 |
| 18 | 1330 |
| 19 | 1348 |
| 20 | 1362 |
| 21 | 1380 |
| 22 | 1398 |
| 23 | 1530 |
| 24 | 1548 |
| 25 | 1698 |
| 26 | 1716 |
| 27 | 1734 |
| 28 | 1866 |
| 29 | 1884 |
| 30 | 1986 |
| 31 | 2004 |
| 32 | 2022 |
| 33 | 2034 |
| 34 | 2052 |
| 35 | 2070 |
| 36 | 2370 |
| 37 | 2388 |
| 38 | 2406 |
| 39 | 2642 |
| 40 | 2660 |
| 41 | 2678 |
| 42 | 2706 |
| 43 | 2724 |
| 44 | 2742 |
| 45 | 3042 |
| 46 | 3060 |
| 47 | 3078 |
| 48 | 3298 |
| 49 | 3316 |
| 50 | 3334 |
| 51 | 3378 |
| 52 | 3396 |
| 53 | 3414 |
| 54 | 3732 |
| 55 | 3750 |
| 56 | 3972 |
| 57 | 3990 |
| 58 | 4068 |
| 59 | 4086 |
| 60 | 4404 |
| 61 | 4422 |
| 62 | 4628 |
| 63 | 4646 |
| 64 | 4740 |
| 65 | 4758 |
| 66 | 5076 |
| 67 | 5094 |
| 68 | 5284 |
| 69 | 5302 |
| 70 | 5412 |
| 71 | 5430 |
| 72 | 5748 |
| 73 | 5766 |
| 74 | 5940 |
| 75 | 5958 |
| 76 | 6084 |
| 77 | 6102 |
| 78 | 6420 |
| 79 | 6438 |
| 80 | 6596 |
| 81 | 6614 |
| 82 | 6756 |
| 83 | 6774 |
| 84 | 7092 |
| 85 | 7110 |
| 86 | 7252 |
| 87 | 7288 |
| 88 | 7428 |
| 89 | 7464 |
| 90 | 7764 |
| 91 | 7800 |
| 92 | 7908 |
| 93 | 7944 |
| 94 | 8100 |
| 95 | 8136 |
| 96 | 8436 |
| 97 | 8472 |
| 98 | 8564 |
| 99 | 8600 |
| 100 | 8772 |
| 101 | 8808 |
| 102 | 9108 |
| 103 | 9144 |
| 104 | 9220 |
| 105 | 9256 |
| 106 | 9444 |
| 107 | 9480 |
| 108 | 9780 |
| 109 | 9816 |
| 110 | 9876 |
| 111 | 9912 |
| 112 | 10116 |
| 113 | 10152 |
| 114 | 10452 |
| 115 | 10488 |
| 116 | 10532 |
| 117 | 10568 |
| 118 | 10788 |
| 119 | 10824 |
| 120 | 11124 |
| 121 | 11178 |
| 122 | 11188 |
| 123 | 11242 |
| 124 | 11460 |
| 125 | 11478 |

The modulation scheme parameter indicates at least one modulation scheme, which the mobile terminal is allowed to use in an uplink transmission. This may, normally, be is the maximum modulation scheme, which UE is allowed to use for uplink transmission. In E-UTRAN, modulation schemes: QPSK, 16 QAM and 64 QAM are possible for uplink transmission, where 64 QAM is the highest modulation scheme and QPSK is the lowest modulation scheme. For instance, the mobile terminal may be allowed to use only QPSK in some operations when in a critical situation. This is because lower order modulation is more robust and would require less transmission power. Secondly, fewer retransmissions may be needed leading to overall reduction in interference but at the expense of lower capacity. In E-UTRAN, where resources are fully allocated by the network (i.e. unlike UTRAN there is no transport format selection by UE), this idea could also be implemented in a radio base station, i.e. the radio base station forbids the use of certain modulation schemes while allocating resources to the UE in protected areas.

The activation probability parameter indicates a probability with which the mobile terminal (102) is allowed to activate its transmitter. The activation probability (PA) is the probability with which UE is allowed to activate its transmitter. A smaller activation probability implies more restricted operation in protected areas and vice versa.

The activation probability parameter may be estimated by the network. The network may generate or estimate the activity probability (parameter) by taking into consideration a number of factors, such as severity of the critical scenario, frequency bands used at the network, cell load, such as number of active users, uplink received interference at the BS, downlink cell transmit power, and the like.

As an example the activation probability can simply be expressed as:

$$P_A = 1 - \min(I_{received}, I_{max})/I_{max} \quad (1)$$

Where:
$I_{max}$=maximum allowed UL received interference in a cell
$I_{received}$=Average UL received interference at the BS
Another example is:

$$P_A = 1 - \min(N_{active}, N_{max})/N_{max} \quad (2)$$

Where:
$N_{max}$=maximum allowed number of active users in a cell
$N_{active}$=current number of active users in a cell.

Three different scenarios in which the activation probability parameter may be used are elaborated in the following three paragraphs.

In a first scenario, the activation probability parameter is used by a mobile terminal at initial access. For instance, a UE will be allowed to initiate a call with a certain activation probability. If UE has not received this parameter prior to a call, rather it has been acquired during the call, then in one embodiment the UE will use this parameter to decide whether to end the call or continue. The call will be continued or ended according to the activation probability parameter. In another embodiment, the activation probability would apply only to the UEs, which are in idle mode. These mobile terminals may use activation probability parameter when initiating a call.

In a second scenario, the activation probability parameter is used by a mobile terminal for transmitting after the mobile terminal has been inactive for a certain period of time. The UE uses the parameter to decide whether to transmit or not after a period of transmission inactivity, i.e. after discontinuous transmission (DTX) or discontinuous reception (DRX) interval or cycle. The DRX and DTX concepts are used in connected mode, in which the UE does not transmit continuously to save its power and to reduce uplink received interference at the base station respectively. These concepts are commonly used in most systems including GSM, UTRAN and E-UTRAN.

In a third scenario, the activation probability is enforced by the network. The network does not send the activation probability. Instead, the network enforces the activation probability by accepting or rejecting the calls at the time of initial access, i.e. during an admission control procedure.

The ranking parameter is based on one or more of at least one radio access technology parameter, at least one data rate parameter, at least one transport block size parameter, at least one modulation scheme parameter, the activation probability parameter, the transmission power parameter, the frequency band parameter, the carrier parameter, the time period parameter, and the service type parameter.

In some embodiments of the method in the radio communication system 100, the following step is performed.

215 In a step 215, the mobile terminal 102 receives a second set of control parameters from the first radio network node 101, 110, wherein the second set of control parameters comprises one or more of the following parameters:
  a transmission power parameter indicating a maximum allowed transmission power,
  a frequency band parameter indicating an allowed frequency band,
  a carrier parameter indicating an allowed sub-set of carrier frequencies, and
  a time period parameter indicating a time period during which the radio emission is to be reduced.

Furthermore, the step 222 of controlling radio emission from the mobile terminal is further based on the second set of control parameters, such as to reduce radio emission from the mobile terminal. In this manner, restriction of the radio emission is based on one or more of the control parameters in the first set of control parameters while also taking into account one or more of the control parameters in the second set of control parameters.

The transmission power parameter indicates a maximum allowed transmission power. This may be set to a value lower than the nominal maximum power of the mobile terminal, with which the mobile terminal is allowed to operate. For instance, a network can limit it to 10 dBm instead of 24 dBm (WCDMA power class) in protected areas (or critical situations). When the mobile terminal is at cell border it may transmit with maximum power. Thus, reduction in maximum power will reduce interference to the electronic devices. An advantage is that the out of band emission, especially in the adjacent frequencies, will be reduced. This is because the higher order frequency components (i.e. harmonics) will also be transmitted with relatively lower power. Weaker harmonics will less likely to affect electronic equipment. The maximum power may be limited in any critical situation. It is typically infrequently modified. For instance, in hospital areas the same lowered maximum power is maintained consistently. However, this is modified e.g. further lowered if hospital acquires more devices which are sensitive to emission control. Advantageously, the transmission power parameter, indicating a maximum allowed transmission power, enables reduction of out of band emission, especially in the adjacent frequencies. This advantage derives from the fact that higher order frequency components (i.e. harmonics) will be transmitted with lower power than low order frequency components (harmonics). Higher order harmonics are more critical since they are more likely to spill over to the operating band of electronic equipment. Therefore weaker higher order harmonics will less likely to affect electronic equipment.

Further, in WCDMA several mobile terminal power classes, which dictate nominal maximum output power of the mobile terminal and corresponding tolerances, are specified. E.g. power classes 21 dBm and 24 dBm. In E-UTRAN, there is at least one power class: 23 dBm. In GSM, there is a power class of 33 dBm. In small cells, the network has the option to reduce the maximum output power of a mobile terminal to a lower value to limit interference, reduce power consumption of the mobile terminal and due to the fact that a mobile terminal, typically, will not operate at its maximum nominal output power. For instance, the maximum output power of a 21 dBm WCDMA mobile terminal may be limited to 10 dBm in cells located indoors. A similar concept may be applied for critical situations. This means that the maximum power reduction would not be dependent upon the cell size or coverage area. Instead, the maximum power reduction may depend on conditions defined by a critical situation.

Minimum and maximum transmitted power levels are specified for mobile terminals and radio base stations. A wireless device (mobile terminal or radio base station) with an active transmitter operates between minimum and maximum transmitted power levels. However, when a transmitter is switched off, the transmission does not completely cease, since some part of the circuitry could still remain active. Although, the entire circuitry may eventually be completely switched off if the transmitter remains inactive for a much longer duration. Nevertheless, the transmit power OFF level is required to be well below the minimum power level. Such requirements are well specified in the standard. For instance, in WCDMA, mobile terminal's minimum transmit power is −50 dBm whereas the transmitted OFF power limit is −56 dBm. At this transmit power OFF level, the OOB emission may conveniently be neglected and would not cause any danger to any other electronic device operating in a nearby frequency band.

It may be noted that the allowed maximum emitted power depends on the geometrical distance and the propagation environment (e.g. path loss factor) between the mobile terminal and the critical equipment (or the critical situation) that is to be protected. For instance, mobile terminals moving away from an operation theatre should be able to use a different power level than those being in the close proximity. However, this aspect may be taken into account when setting the control parameters to be sent by the network.

The frequency band parameter indicates an allowed frequency band. In this manner, by restriction of the use to a certain portion of a frequency band, for example restricting higher frequency, out of band emission may be reduced. This means a multi-band UE may still operate in unrestricted frequency bands. Advantageously, the concept of restricting bandwidth or part of the band is applied when UE enters in a protected area.

The most severe impact of the interference due to the out of band emission is experienced by a device operating in adjacent or nearby frequency band. It is likely that an operator owns carrier frequencies, which are adjacent to a frequency band or carrier frequencies allocated for very critical operation e.g. aircraft communication system. In such scenario it is important to restrict at least a portion of the frequency, which is close to critical frequency but only when operating in a critical scenario e.g. in airport areas. Typically, this approach of complete restriction of frequency portion or frequency band is required where none of the radio access technologies can guarantee acceptable level of interference.

The carrier parameter indicates an allowed sub-set of carrier frequencies. This parameter restricts the use of one or more carrier frequencies in certain band(s) in critical situations. Only operation of the mobile terminal in these carriers frequencies in the corresponding bands will be restricted. Advantageously, when a relatively broad frequency band is used, it is preferred to limit the restrictions to a subset of a large number of carries, comprised in the frequency band. Thus, certain carriers may be more prone to introducing harmful interference than the others.

In OFDMA system such as E-UTRAN or Wireless LAN, typically part of the bandwidth is used by the UE for transmission. However, if very high data rate is desired the entire resources can also be allocated to the UE. In E-UTRAN, a time-frequency resource called a resource block, which comprises of 1 slot in time (0.5 ms) and 12 sub-carriers each of 15 KHz (12×15=180 KHz), is smallest unit allocated to UE for data transmission. In 10 MHz bandwidth up to 50 resource blocks are allowed. Thus, the idea is to restrict certain resource blocks as this will reduce interference. Depending upon the technology, this could either be enforced by a parameter sent to the base station or by implementation in the base station.

Another level of restriction is to prohibit the use of certain bandwidths in systems supporting multiple bandwidths. For instance E-UTRAN, which supports several bandwidths (1.4, 3, 5, 10, 15 and 20 MHz) certain bandwidths could be restricted e.g. bandwidths above 5 MHz can be restricted.

Yet another level of restriction can be enforced in multicarrier systems e.g. multicarrier CDMA, advanced E-UTRAN (i.e. LTE advanced) etc., where UE can use more than one carriers at a time. This means a mobile terminal will have more than one receiver and transmitter. In this situation, the use of one or more carriers in the critical situation may be restricted.

Restriction of an entire frequency band is more severe than the restriction of sub-set of carriers. The restriction is required to protect electronic equipment operating in a critical area in a frequency band which is adjacent or close to the mobile operating band. The most severe impact of the interference due to the out of band emission is experienced by a device operating in adjacent or nearby frequency band. It is likely that an operator owns carrier frequencies, which are adjacent to a frequency band or carrier frequencies allocated for very critical operation e.g. aircraft communication system. In such scenario, it is preferred to restrict at least a portion of the frequency, which is close to critical frequency but only when operating in a critical scenario e.g. in airport areas. Typically, this approach of complete restriction of frequency portion or frequency band is required where none of the RAT can guarantee acceptable level of interference.

The time period parameter indicates a time period during which the radio emission is to be reduced. Expressed differently, the time period parameter indicates some duration of time in which the critical situation occurs. This means that after this duration the mobile terminal (UE) is allowed to use its transmitter. Advantageously, the time period allows restriction of radio emission to be limited to a certain period of time, such as during take-off or landing of an aircraft.

In embodiments of the method in the system according to FIG. 1 for controlling radio emission from the mobile terminal, the mobile terminal 102 may use any combination of parameters to reduce transmission in a critical situation.

In a first example, the mobile terminal uses one allowed radio access technology (derived from the radio access technology parameter) and restricted set of transport formats for the allowed radio access technology (derived from the transport block size parameter). Optionally, the mobile terminal 102 may use two allowed radio access technologies and a restricted set of transport format for each radio access technology. In this manner, the mobile terminal 102 reduces its emitted radio emission.

In a second example, the mobile terminal uses two or more parameters taken from the first and/or second set of control parameters, such as one allowed radio access technology (RAT), low power mode and selected portion of frequency for the allowed RAT. Yet another example is that the mobile terminal may operate in a certain allowed RAT (e.g. UTRAN FDD) with a certain activation probability (PA=0.2) over a certain time duration (TD=60 seconds).

In a third example, the mobile terminal uses two or more parameters taken from the second set of control parameters, such as allowed carrier frequency or portion of band, restricted level of output power (low power mode) and maximum allowed time for restriction operation.

In some embodiments of the method performed in the system of FIG. 1, the following steps may be performed.

217 In an optional step 217, the first radio network node 101, 110 or the mobile terminal 102 determines a ranking parameter based on the first and/or second set of parameters, wherein the ranking parameter indicates a radio access technology for which transmission is the least restricted due to a critical area.

218 In an optional step 218, the first radio network node 101, 110 sends the ranking parameter to the mobile terminal 102. This step is preferably performed if the first radio network node 101, 110 performed the step 217.

In some embodiments of the method performed in the radio communication system 100 of FIG. 1, the determination in step 217 of the ranking parameter further is based on a service type parameter, indicating a service such as a voice, video or data service.

In some embodiments of the method in the radio communication system 100, the following step is performed, if the first set of parameters comprises the activation probability parameter.

225 In a step 225, the mobile terminal sends a request to attach to the first radio network node 101, 110. Expressed differently, the mobile terminal sends a service request to the first radio network node 101, 110.

227 In a step 227, the first radio network node 101, 110 denies the request if total received power at the first radio network node 101, 110 exceeds a predetermined threshold, the total received power comprising an aggregated received power from mobile terminals 102 attached to the first radio network node 101, 110 and, optionally, a noise margin, wherein the predetermined threshold is based on conditions defined by the critical area.

In some embodiments of the method in the radio communication system 100, the following step is performed, if the first set of parameters comprises the activation probability parameter.

The step 225 is performed.
228 In a step 228, the first radio network node 101, 110 denies the request if an aggregated number of mobile terminals 102 attached to the first radio network node 101, 110 exceeds a predetermined number of mobile terminals, wherein the predetermined number is based on conditions defined by the critical area.

Figure 3:
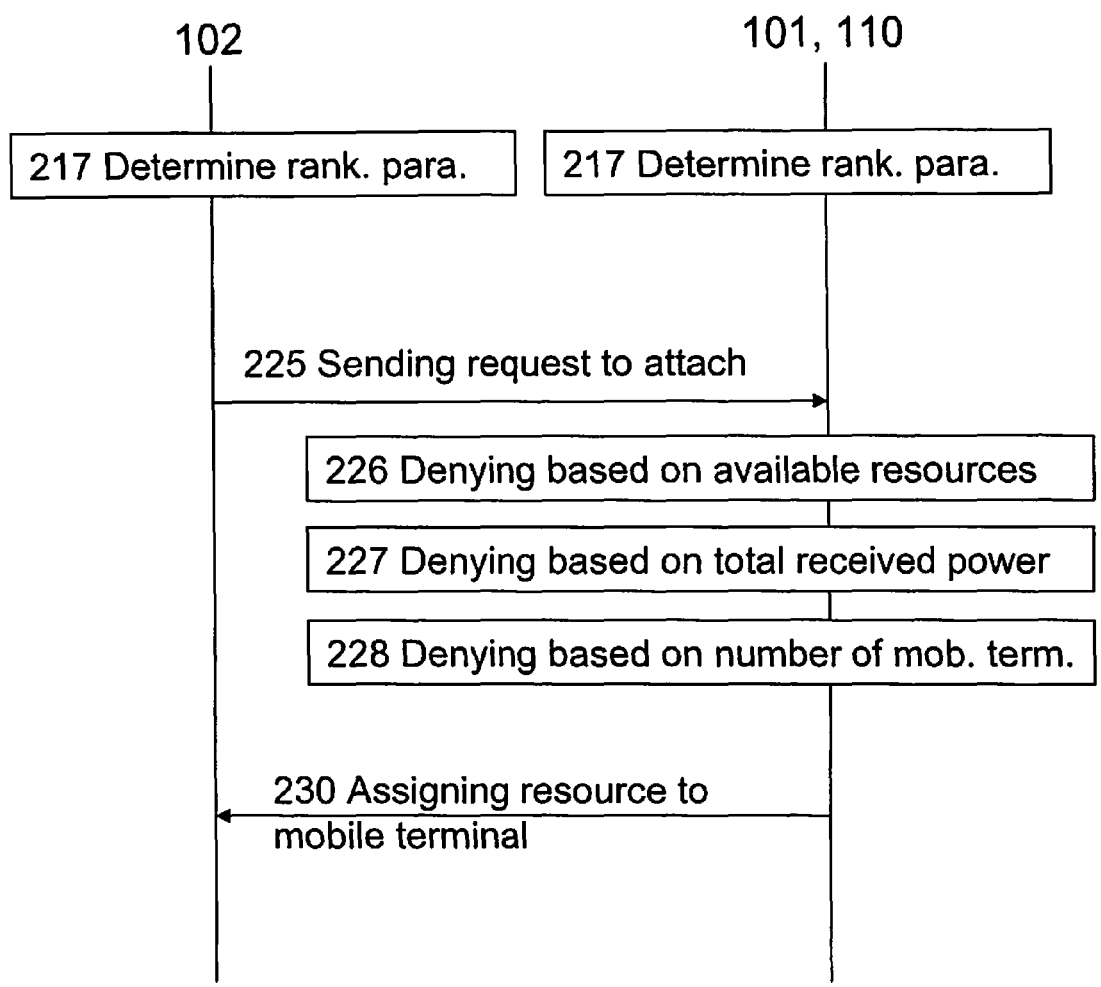
FIG. 3 shows a schematic, combined signalling and flow chart of an embodiment of a method in the radio communication system for determining a ranking parameter for a radio access technology.

Now referring to FIG. 3, there is shown an exemplifying method in the radio communication system 100 according to FIG. 1 for determining a ranking parameter for a radio access technology, wherein the ranking parameter indicates a radio access technology for which transmission is the least restricted due to a critical area. The following steps may be performed.

217 In a step 217, the radio communication network node 101, 102, 110 determines the ranking parameter based on a third set of control parameters comprising one or more of the following parameters at least one radio access technology parameter indicating a radio access technology for which operation of the mobile terminal (102) is restricted, at least one data rate parameter indicating a maximum data rate at which the mobile terminal 102 is allowed to transmit, at least one transport block size parameter indicating at least one transport block size, which the mobile terminal 102 is allowed to use in an uplink transmission, at least one modulation scheme parameter indicating at least one modulation scheme, which the mobile terminal 102 is allowed to use in an uplink transmission, an activation probability parameter indicating a probability with which the mobile terminal 102 is allowed to activate its transmitter, a transmission power parameter indicating a maximum allowed transmission power, a frequency band parameter indicating an allowed frequency band, a carrier parameter indicating an allowed sub-set of carrier frequencies, a time period parameter indicating a time period during which the radio emission is to be reduced, and a service type parameter, indicating a type of service such as a voice, video or data service.

In some embodiments of the method in the radio communication system 100, the radio communication network node 101, 102, 110 is a first radio network node 101, 110.

In some embodiments of the method in the radio communication system 100, if the radio communication network node 101, 102, 110 is the first radio network node 101, 110, the following step may be performed.

218 In a step 218, the first radio network node 101, 110 sends the ranking parameter to a mobile terminal 102.

In some embodiments of the method in the radio communication system 100, if the radio communication network node 101, 102, 110 is the first radio network node 101, 110, the ranking parameter may be used in an admission control procedure. The following steps may be performed.

225 In a step 225, the first radio network node 101, 110 receives a service request from the mobile terminal 102, i.e. a request to attach to the radio communication system 100 via the first radio network node 101, 110.

226 In a step 226, the first radio network node 110 denies the request if resources required by the service indicated by the received service request is greater than available resources of the radio access technology indicated by the ranking parameter. Available resource are resources which are free, i.e. not used or occupied by a mobile terminal.

In some embodiments of the method in the radio communication system 100, the radio communication network node may be a mobile terminal 102 and the third set of control parameters is received from a core network node 110.

In some embodiments of the method in the radio communication system 100, if the radio communication network node is a mobile terminal 102, the mobile terminal 102 uses the ranking parameter to determine which radio access technology to use when sending a service request to the first radio network node 101, 110.

In embodiments of the method in the radio communication system 100, the sending of a location parameter of the critical situation, such as a critical or protected area or a time period for when emission is restricted, may comprise area coordinates of the critical area or a time interval. A critical area may be defined by latitude, longitude and radius. Alternatively, the network may provide three or more coordinates forming a polygon where the mobile terminal or UE may determine the critical area from the coordinates. The UE will use these parameters and compare it with its geographical position. If UE is in the protected area then it will restrict its operation according to one or more parameters sent to the UE.

Also in FIG. 3, there is shown another exemplifying method in the radio communication system 100, if the radio communication network node is the first network node 101, 110. The following steps may be performed.

225 In a step 225, the first radio network node 101, 110 receives a service request from the mobile terminal 102, i.e. a request to attach to the radio communication system 100 via the first radio network node 101, 110.

227 In a step 227, the first radio network node 101, 110 denies the request if total received power at the first radio network node 101, 110 exceeds a predetermined threshold, the total received power comprising an aggregated received power from mobile terminals (102) attached to the first radio network node 101, 110 and, optionally, a noise margin, wherein the predetermined threshold is based on conditions defined by the critical area.

Again with reference to FIG. 3, there is shown a further exemplifying method in the radio communication system 100, if the radio communication network node is the first network node 101, 110. The following steps may be performed.

225 In a step 225, the first radio network node 101, 110 receives a service request from the mobile terminal 102.

228 In a step 228, the first radio network node 101, 110 denies the request if an aggregated number of mobile terminals 102 attached to the core network node 110 exceeds a predetermined number of mobile terminals, wherein the predetermined number is based on conditions defined by the critical area.

Figure 4:
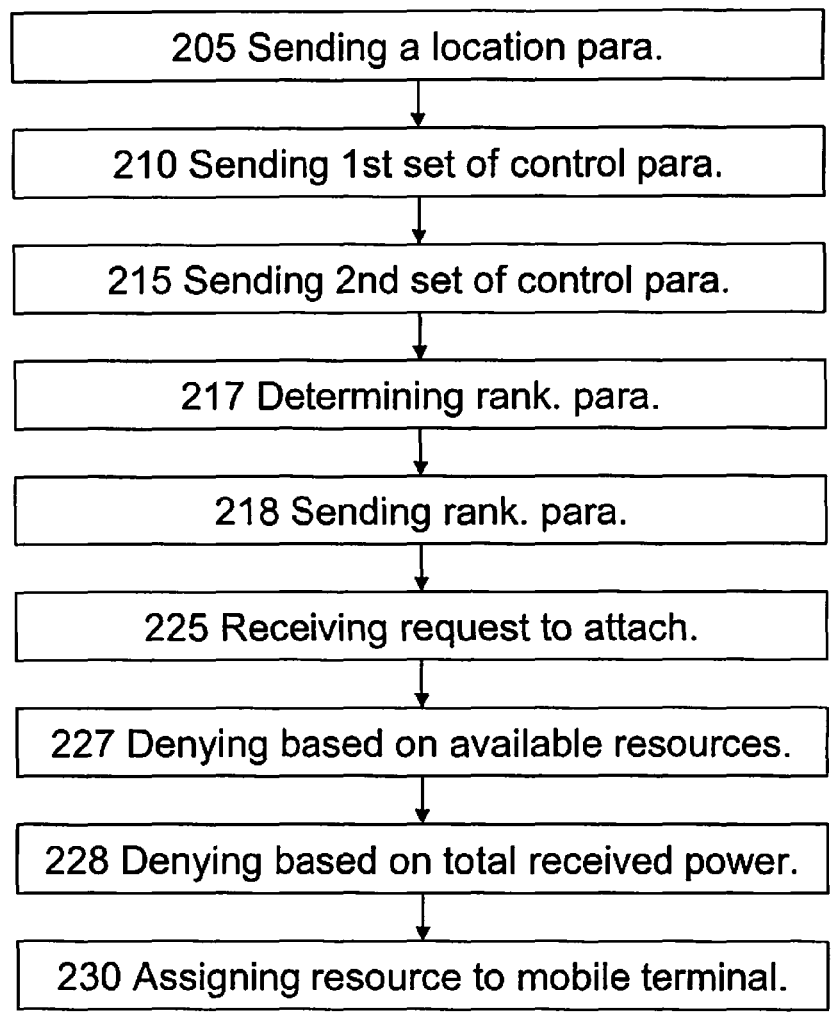
FIG. 4 shows a schematic flow chart of an embodiment of the method in the network node for controlling radio emission from a mobile terminal.

In FIG. 4, there is shown a schematic flow chart of an embodiment of the method in the first radio network node 101, 110 for controlling radio emission from a mobile terminal 102. The mobile terminal 102 is located in a critical area in which radio emission from the mobile terminal is to be at least partly reduced. A radio communication system 100 comprises the first radio network node 101, 110 and the mobile terminal 102. The following steps may be performed.

205 In a step 205, the first radio network node 101, 110 sends a location parameter of the critical area to the mobile terminal 102, wherein the critical area has a geographical location and the location parameter indicates the geographical location of the critical area.

210 In a step 210, the first radio network node 101, 110 sends a first set of control parameters to the mobile terminal 102. The first set of control parameters comprises one or more of the following parameters at least one radio access technology parameter indicating a radio access technology for which operation of the mobile terminal 102 is restricted, at least one data rate parameter indicating a maximum data rate at which the mobile terminal 102 is allowed to transmit, at least one transport block size parameter indicating at least one transport block size, which the mobile terminal 102 is allowed to use in an uplink transmission, at least one modulation scheme parameter indicating at least one modulation scheme, which the mobile terminal 102 is allowed to use in an uplink transmission, and an activation probability parameter indicating a probability with which the mobile terminal 102 is allowed to activate its transmitter.

Furthermore, the location parameter and the first set of control parameters are useable by the mobile terminal 102 for controlling radio emission therefrom.

It may be noted that the first radio network node 101, 110 may be a radio base station node, radio network controller node, base station controller, home base station, a mobility management entity or the like.

In some embodiments of the method in the first radio network node 101, 110, the transport block size parameter indicates a maximum allowed transport block size, whereby any transport block size, being less than or equal to the maximum transport block size, is allowed to be used by the mobile terminal 102. This embodiment refers to a WCDMA system, in which a mobile terminal may select any transport block size up to a maximum allowed transport block size, sent (broadcast) by the first radio network node 101, 110.

In some embodiments of the method in first radio network node 101, 110, the transport block size parameter indicates the only allowed transport block size to be used by the mobile terminal 102. This embodiment refers to a LTE system, in which the allowed transport block size is sent by the first radio network node to the mobile terminal. In the LTE system, the network controls the transport block size.

In some embodiments of the method in the first radio network node 101, 110, the maximum allowed transport block size is represented by a transport block index. In this manner, the amount of overhead data may be reduced.

In some embodiments of the method in the first radio network node 101, 110, at least one of said at least one data rate parameter, said at least one transport block size parameter, and said at least one modulation scheme parameter is dependent on one of said at least one radio access technology parameter, preferably said at least one data rate parameter, said at least one transport block size parameter, and said at least one modulation scheme parameter are dependent on said at least one radio access technology, respectively.

In some embodiments of the method in the first radio network node 101, 110, the following step is performed.

215 In a step 215, the first radio network node 101, 110 sends a first set of control parameters to the mobile terminal 102, wherein the second set of control parameters comprises one or more of the following parameters:

a transmission power parameter indicating a maximum allowed transmission power, a frequency band parameter indicating an allowed frequency band, a carrier parameter indicating an allowed sub-set of carrier frequencies, and a time period parameter indicating a time period during which the radio emission is to be reduced.

The second set of control parameters is useable, in combination with the location parameter and the first set of control parameters, by the mobile terminal 102 for controlling radio emission therefrom.

In some embodiments of the method in the first radio network node 101, 110, if the first set of parameters comprises the activation probability parameter, the following steps may be performed.

225 In a step 225, the first radio network node receives a request to attach to the first radio network node 101, 110 from a mobile terminal 102.

227 In a step 227, the first radio network node denies the request if total received power at the first radio network node 101, 110 exceeds a predetermined threshold, the total received power comprising an aggregated received power from mobile terminals 102 attached to the first radio network node 101, 110 and, optionally a noise margin, wherein the predetermined threshold is based on conditions defined by the critical area.

In some embodiments of the method in the first radio network node 101, 110, if the first set of parameters comprises the activation probability parameter, the following steps may be performed.

225 In a step 225, the first radio network node 101, 110 receives a request to attach to the first radio network node 101, 110 from a mobile terminal.

228 In a step 228, the first radio network node 101, 110 denies the request if an aggregated number of mobile terminals 102 attached to the first radio network node 101, 110 exceeds a predetermined number of mobile terminals, wherein the predetermined number is based on conditions defined by the critical area.

Figure 5:
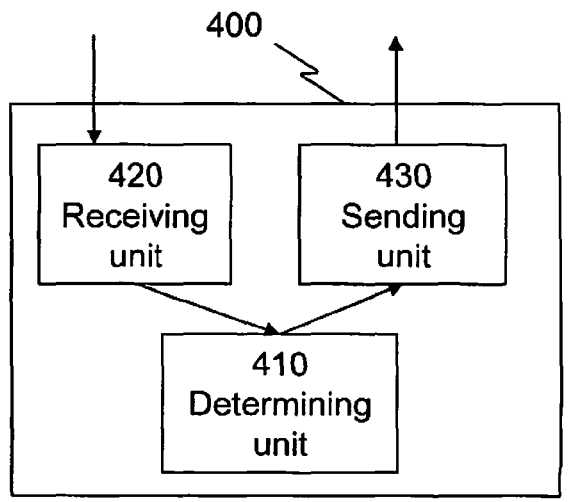
FIG. 5 shows a schematic block diagram of an embodiment of the arrangement in the network node controlling radio emission from a mobile terminal.

In FIG. 5, there is shown schematic block diagram of an embodiment of the arrangement 400 in the first radio network node 101, 110 for controlling radio emission from a mobile terminal 102. The mobile terminal 102 is located in a critical area in which radio emission from the mobile terminal is to be at least partly reduced. A radio communication system 100 is arranged to comprise the first radio network node 101, 110 and the mobile terminal 102. Furthermore, the arrangement 400 comprises a sending unit 430 configured to send a location parameter of the critical area to the mobile terminal 102. The critical area has a geographical location and the location parameter indicates the geographical location of the critical area. Optionally, the arrangement 400 comprises a receiving unit 420 and a determining (processing) unit 410. Moreover, the sending unit 430 is further configured to send a first set of control parameters to the mobile terminal 102. The first set of control parameters comprises one or more of the following parameters

- at least one radio access technology parameter indicating a radio access technology for which operation of the mobile terminal 102 is restricted,
- at least one data rate parameter indicating a maximum data rate at which the mobile terminal 102 is allowed to transmit,
- at least one transport block size parameter indicating at least one transport block size, which the mobile terminal 102 is allowed to use in an uplink transmission,
- at least one modulation scheme parameter indicating at least one modulation scheme, which the mobile terminal 102 is allowed to use in an uplink transmission, and
- an activation probability parameter indicating a probability with which the mobile terminal 102 is allowed to activate its transmitter.

Further, the location parameter and the first set of control parameters are useable by the mobile terminal 102 for controlling radio emission therefrom.

In some embodiments of the arrangement 400 in the first radio network node 101, 110, the transport block size parameter indicates a maximum allowed transport block size, whereby any transport block size, being less than or equal to the maximum transport block size, is allowed to be used by the mobile terminal 102. This embodiment refers to a WCDMA system, in which a mobile terminal may select any transport block size up to a maximum allowed transport block size, sent (broadcast) by the first radio network node 101, 110.

In some embodiments of the arrangement 400 in first radio network node 101, 110, the transport block size parameter indicates the only allowed transport block size to be used by the mobile terminal 102. This embodiment refers to a LTE system, in which the allowed transport block size is sent by the first radio network node to the mobile terminal. In the LTE system, the network controls the transport block size.

In some embodiments of the arrangement 400 in the first radio network node 101, 110, the maximum allowed transport block size is represented by a transport block index. In this manner, the amount of overhead data may be reduced.

In some embodiments of the method in the first radio network node 101, 110, at least one of said at least one data rate parameter, said at least one transport block size parameter, and said at least one modulation scheme parameter is dependent on one of said at least one radio access technology parameter, preferably said at least one data rate parameter, said at least one transport block size parameter, and said at least one modulation scheme parameter are dependent on said at least one radio access technology, respectively.

In some embodiments of the arrangement 400 in the first radio network node 101, 110, the sending unit 430 is further configured to send a second set of control parameters to the mobile terminal 102, wherein the second set of control parameters comprises one or more of the following parameters:

- a transmission power parameter indicating a maximum allowed transmission power,
- a frequency band parameter indicating an allowed frequency band,
- a carrier parameter indicating an allowed sub-set of carrier frequencies, and
- a time period parameter indicating a time period during which the radio emission is to be reduced.

The second set of control parameters is useable, in combination with the location parameter and the first set of control parameters, by the mobile terminal 102 for controlling radio emission therefrom.

In some embodiments of the arrangement 400 in the first radio network node 101, 110, if the first set of parameters comprises the activation probability parameter, the receiving unit 420 is configured to receive a request to attach to the first radio network node 101, 110 from a mobile terminal 102. Furthermore, the determining unit 410 is configured to deny the request if total received power at the first radio network node 101, 110 exceeds a predetermined threshold, the total received power comprising an aggregated received power from mobile terminals 102 attached to the first radio network node 101, 110 and, optionally a noise margin, wherein the predetermined threshold is based on conditions defined by the critical area.

In some embodiments of the arrangement 400 in the first radio network node 101, 110, if the first set of parameters comprises the activation probability parameter, the receiving unit 420 is configured to receive a request to attach to the first radio network node 101, 110 from a mobile terminal. Moreover, the determining unit 410 is configured to deny the request if an aggregated number of mobile terminals 102 attached to the first radio network node 101, 110 exceeds a predetermined mobile terminal number, wherein the predetermined number is based on conditions defined by the critical area.

Figure 6:
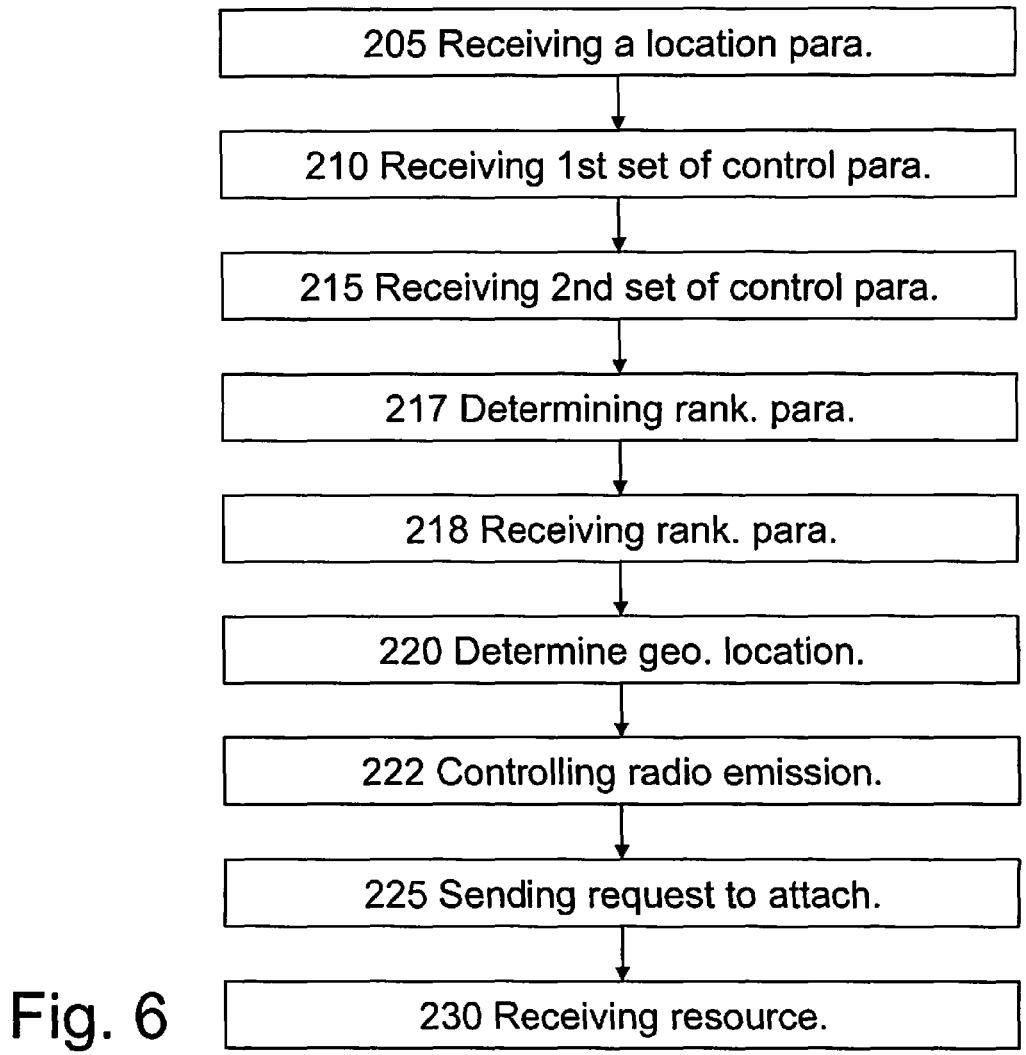
FIG. 6 shows a schematic flow chart of an embodiment of the method in the mobile terminal for controlling radio emission from the mobile terminal.

In FIG. 6, there is shown a schematic flow chart of an embodiment of the method in the mobile terminal 102 for controlling radio emission from the mobile terminal 102. A radio communication system 100 comprises the mobile terminal 102 and a first radio network node 101, 110. The following steps may be performed.

205 In a step 205, the mobile terminal 102 receives a location parameter of a critical area from the first radio network node 101, 110, wherein the critical area has a geographical location and the location parameter indicates the geographical location of the critical area.

210 In a step 210, the mobile terminal 102 receives a first set of control parameters from the first radio network node 101, 110. The first set of control parameters comprises one or more of the following parameters
- at least one radio access technology parameter indicating a radio access technology for which operation of the mobile terminal 102 is restricted,
- at least one data rate parameter indicating a maximum data rate at which the mobile terminal 102 is allowed to transmit,
- at least one transport block size parameter indicating at least one transport block size, which the mobile terminal 102 is allowed to use in an uplink transmission,
- at least one modulation scheme parameter indicating at least one modulation scheme, which the mobile terminal 102 is allowed to use in an uplink transmission, and
- an activation probability parameter indicating a probability with which the mobile terminal 102 is allowed to activate its transmitter.

220 In a step 220, the mobile terminal 102 determines a geographical location of the mobile terminal 102.

222 In a step 222, the mobile terminal 102 controls radio emission from the mobile terminal based on the first set of control parameters, the location parameter and the geographical location of the mobile terminal 102.

In some embodiments of the method in the mobile terminal 102, the indication of at least one transport block size indicates a maximum allowed transport block size, whereby any transport block size, being less than or equal to the maximum allowed transport block size, is allowed to be used by the mobile terminal 102.

In some embodiments of the method in the mobile terminal 102, at least one of said at least one data rate parameter, said at least one transport block size parameter, and said at least one modulation scheme parameter is dependent on one of said at least one radio access technology parameter.

In some embodiments of the method in the mobile terminal 102, the following steps may be performed.

215 In a step 215, the mobile terminal 102 receives a second set of control parameters from the first radio network node 101, 110, wherein the second set of control parameters comprises one or more of the following parameters:
- a transmission power parameter indicating a maximum allowed transmission power,
- a frequency band parameter indicating an allowed frequency band,
- a carrier parameter indicating an allowed sub-set of carrier frequencies, and
- a time period parameter indicating a time period during which the radio emission is to be reduced.

The step of controlling 222 radio emission from the mobile terminal is further based on the second set of control parameters, such as to reduce radio emission from the mobile terminal.

Figure 7:
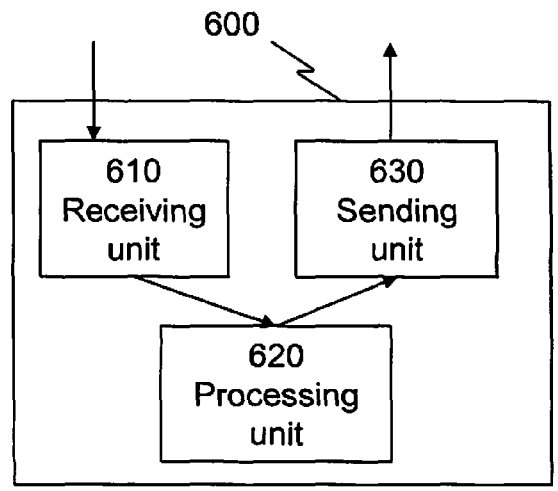
FIG. 7 shows a schematic block diagram of an embodiment of the arrangement in the mobile terminal for controlling radio emission from the mobile terminal.

In FIG. 7, there is shown a schematic block diagram of an embodiment of the arrangement 600 in the mobile terminal 102 for controlling radio emission from the mobile terminal 102. A radio communication system 100 is arranged to comprise the mobile terminal 102 and a first radio network node 101, 110. The arrangement 600 comprises a receiving unit 610 configured to receive a location parameter of a critical area from the first radio network node 101, 110. The critical area has a geographical location and the location parameter indicates the geographical location of the critical area.

Optionally, the arrangement 600 comprises a sending unit 630 and a processing unit 620. Moreover, the receiving unit 610 is further configured to receive a first set of control parameters from the first radio network node 101, 110. The first set of control parameters comprises one or more of the following parameters
- at least one radio access technology parameter indicating a radio access technology for which operation of the mobile terminal 102 is restricted,
- at least one data rate parameter indicating a maximum data rate at which the mobile terminal 102 is allowed to transmit,
- at least one transport block size parameter indicating at least one transport block size, which the mobile terminal 102 is allowed to use in an uplink transmission,
- at least one modulation scheme parameter indicating at least one modulation scheme, which the mobile terminal 102 is allowed to use in an uplink transmission, and
- an activation probability parameter indicating a probability with which the mobile terminal 102 is allowed to activate its transmitter.

Furthermore, the arrangement 600 comprises a processing unit 620 configured to determine a geographical location of the mobile terminal 102. The processing unit 620 is further configured to control radio emission from the mobile terminal based on the first set of control parameters, the location parameter and the geographical location of the mobile terminal 102.

In some embodiments of the arrangement 600 in the mobile terminal 102, the indication of at least one transport block size indicates a maximum allowed transport block size, whereby any transport block size, being less than or equal to the maximum allowed transport block size, is allowed to be used by the mobile terminal 102.

In some embodiments of the arrangement 600 in the mobile terminal 102, at least one of said at least one data rate parameter, said at least one transport block size parameter, and said at least one modulation scheme parameter is dependent on one of said at least one radio access technology parameter.

In some embodiments of the arrangement 600 in the mobile terminal 102, the receiving unit 610 is configured to receive a second set of control parameters from the first radio network node 101, 110, wherein the second set of control parameters comprises one or more of the following parameters:
- a transmission power parameter indicating a maximum allowed transmission power,
- a frequency band parameter indicating an allowed frequency band,
- a carrier parameter indicating an allowed sub-set of carrier frequencies, and
- a time period parameter indicating a time period during which the radio emission is to be reduced.

Moreover, the processing unit 620 is configured to control radio emission from the mobile terminal is further based on the second set of control parameters, such as to reduce radio emission from the mobile terminal.

Figure 8:
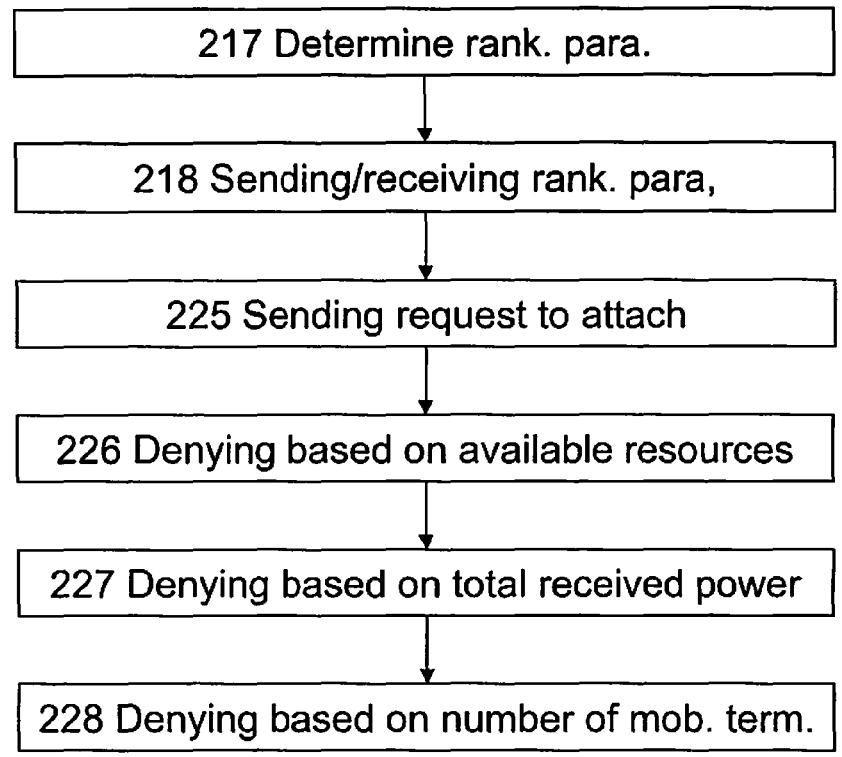
FIG. 8 shows a schematic flow chart of an embodiment of the method in the radio communication network node for determining a ranking parameter for a radio access technology.

With reference to FIG. 8, there is shown a schematic flow chart of an embodiment of the method in a radio communication network node 101, 102, 110 for determining a ranking parameter defining a measure for a radio access technology. The measure is indicative of restrictions applicable to the radio access technology as defined by a critical area. The following steps may be performed.

217 In a step 217, the radio communication network node 101, 102, 110 determines the ranking parameter based on a third set of control parameters. The third set of control parameters comprises one or more of the following parameters
- at least one radio access technology parameter indicating a radio access technology for which operation of the mobile terminal 102 is restricted,
- at least one data rate parameter indicating a maximum data rate at which the mobile terminal 102 is allowed to transmit,
- at least one transport block size parameter indicating at least one transport block size, which the mobile terminal 102 is allowed to use in an uplink transmission,
- at least one modulation scheme parameter indicating at least one modulation scheme, which the mobile terminal 102 is allowed to use in an uplink transmission,
- an activation probability parameter indicating a probability with which the mobile terminal 102 is allowed to activate its transmitter,
- a transmission power parameter indicating a maximum allowed transmission power,
- a frequency band parameter indicating an allowed frequency band,
- a carrier parameter indicating an allowed sub-set of carrier frequencies,
- a time period parameter indicating a time period during which the radio emission is to be reduced, and
- a service type parameter, indicating a type of service such as a voice, video or data service.

In some embodiments of the method in the radio communication network node 101, 102, 110, the radio communication network node 101, 102, 110 is a first radio network node 101, 110, such as a core network node, a radio base station node, a mobility management entity, a home subscriber system or a radio network controller node or the like.

In some embodiments of the method in the radio communication network node 101, 102, 110, the radio communication network node 101, 102, 110 is a first radio network node 101, 110 and the following step may be performed.

218 In a step 218, the first radio network node 101, 110 sends the ranking parameter to a mobile terminal 102. In this manner, the mobile terminal may use the ranking parameter for selecting a radio access technology that is allowed with the respect to the critical situation.

In some embodiments of the method in the radio communication network node 101, 102, 110, the radio communication network node 101, 102, 110 is a first radio network node 101, 110 and the following steps may be performed.

225 In a step 225, the first network node 101, 110 receives a service request from the mobile terminal 102.

226 In a step 226, the first network node 101, 110 denies the request if resources required by the service indicated by the received service request is greater than available resources of the radio access technology indicated by the ranking parameter. This mechanism of access control or admission control will ensure that on the one hand the emission level remains within a desired limit in critical areas and, on the other hand, an operator is able to provide maximum possible service to the intended users. In order to realize this admission control mechanism the network needs to rank different RAT in terms of their restriction level.

In some embodiments of the method in the radio communication network node 101, 102, 110, the radio communication network node 101, 102, 110 is a first radio network node 101, 110 and the following steps may be performed. In a first step, the mobile terminal attempts to setup a call and sends request for establishing a particular service. Next, the first network node assigns an appropriate radio access technology to the mobile terminal, i.e. one with least restrictions, based on the ranking parameter. It may be noted that the first network node easily may maintain the ranking tables that are needed. In addition, the first network node may update the tables over time as needed.

In some embodiments of the method in the radio communication network node 101, 102, 110, the radio communication network node 101, 102, 110 is a first radio network node 101, 110 and the following steps may be performed. If the mobile terminal is active, i.e. there may be a phone call ongoing. As stated above the ranking parameter, which is a function of a number of control parameters may change over time. Possibly, the restrictions may change due to the mobile terminal is changing service type, which may require a change of radio access technology. Similarly, a mobile terminal may move from normal area (unrestricted area) to a critical situation. In this scenario, the radio access technology used by the mobile terminal in an unrestricted area may have a very low ranking in the protected area. This means that during a call due to any of the reasons above, the network may have to redirect the mobile terminal to a different RAT other than the one assigned at the start of the call. This would make sure that the mobile terminal remains connected to the RAT with least restrictions. Redirection of RAT during a call is realized by performing inter-RAT handover i.e. changing from existing RAT with lower rank (e.g. E-UTAN FDD) to a new RAT with higher ranking (e.g. GSM).

In some embodiments of the method in the radio communication network node 101, 102, 110, the radio communication network node 101, 102, 110 is a mobile terminal 102 and the third set of control parameters is received from a first radio network node 101, 110, such as a core network node, a radio base station node, a mobility management entity or a radio network controller node or the like. In other words, the ranking parameter and/or the parameters on which the ranking parameter may be based, i.e. the third set of control parameters (examples are found in table 4 or table 5) are sent by the first radio network node to the mobile terminal. The mobile terminal then accesses the radio access technology with least restrictions. This means the mobile terminal will perform initial access, e.g. attempt to setup a call on the radio access technology first, provided the radio access technology is supported by this mobile terminal.

An example of how the first radio network node may calculate the ranking parameter is shown in table 4.

TABLE 4

An example of creation of ranking for RAT by the network

| No | RAT | Max allowed UL data rate (R) | Max allowed UE power (p) | Activation probability ($P_A$) | Restricted frequency portions ($F_P$) | Restriction Time period ($T_D$) | Overall RAT ranking (K) |
|---|---|---|---|---|---|---|---|
| 1 | GSM | $R_1$ | $p_1$ | $P_{A1}$ | $F_{P1}$ | $T_{D1}$ | 4 |
| 2 | UTRAN FDD | $R_2$ | $p_2$ | $P_{A2}$ | $F_{P2}$ | $T_{D2}$ | 5 |

TABLE 4-continued

An example of creation of ranking for RAT by the network

| No | RAT | Max allowed UL data rate (R) | Max allowed UE power (p) | Activation probability ($P_A$) | Restricted frequency portions ($F_P$) | Restriction Time period ($T_D$) | Overall RAT ranking (K) |
|---|---|---|---|---|---|---|---|
| 3 | UTRAN TDD | $R_3$ | $p_3$ | $P_{A3}$ | $F_{P3}$ | $T_{D3}$ | 3 |
| 4 | E-UTRAN FDD | $R_4$ | $p_4$ | $P_{A4}$ | $F_{P4}$ | $T_{D4}$ | 1 |
| 5 | E-UTRAN TDD | $R_5$ | $p_5$ | $P_{A5}$ | $F_{P5}$ | $T_{D5}$ | 2 |

The ranking parameter ($K_i$) for RAT i may be estimated by using the following generalized expression:

$$K_i = F(\alpha_1 R_i, \alpha_2 p_i, \alpha_3 P_{Ai}, \alpha_4 F_{Pi}, \alpha_5 T_{Di}) \quad (3)$$

As an example the ranking parameter ($K_i$) for RAT i may be estimated by using a particular expression:

$$K_i = \alpha_1 R_i + \alpha_2 p_i + \alpha_3 P_{Ai} + \alpha_4 F_{Pi} + \alpha_5 T_{Di} \quad (4)$$

Where $\alpha_1$, $\alpha_2$, $\alpha_3$, $\alpha_4$ and $\alpha_5$ are suitable weighted factors.

The expression in (3) or the specific function in (4) may be used to determine the ranking parameter for each RAT. For example, rank 5 means least restricted RAT whereas rank 1 means most restricted RAT. This means RAT with rank 5, i.e. UTRAN FDD should be selected provided it is supported by the mobile terminal. Otherwise the mobile terminal will select the next available RAT, e.g. GSM which has rank 4.

The ranking parameter may further be based on the service type parameter, as shown in Table 5.

TABLE 5

An example of creation of RAT ranking by the network also considering the service type

| No | RAT | Max allowed UL data rate (R) | Max allowed UE power (p) | Activation probability ($P_A$) | Restricted frequency portions ($F_P$) | Restriction Time period ($T_D$) | Overall RAT ranking (K) | | |
|---|---|---|---|---|---|---|---|---|---|
| | | | | | | | Service type 1 e.g. speech | Service type 2 e.g. steaming | Service type 3 e.g. browsing |
| 1 | GSM | $R_1$ | $p_1$ | $P_{A1}$ | $F_{P1}$ | $T_{D1}$ | 1 | 3 | 2 |
| 2 | UTRAN FDD | $R_2$ | $p_2$ | $P_{A2}$ | $F_{P2}$ | $T_{D2}$ | 3 | 2 | 4 |
| 3 | UTRAN TDD | $R_3$ | $p_3$ | $P_{A3}$ | $F_{P3}$ | $T_{D3}$ | 2 | 4 | 4 |
| 4 | E-UTRAN FDD | $R_4$ | $p_4$ | $P_{A4}$ | $F_{P4}$ | $T_{D4}$ | 2 | 3 | 3 |
| 5 | E-UTRAN TDD | $R_5$ | $p_5$ | $P_{A5}$ | $F_{P5}$ | $T_{D5}$ | 5 | 4 | 3 |

The ranking parameter ($K_i^j$) for RAT i and for service type parameter j may be estimated by using the following generalized expression:

$$K_i^j = F(\alpha_1 R_i, \alpha_2 p_i, \alpha_3 P_{Ai}, \alpha_4 F_{Pi}, \alpha_5 T_{Di}, \alpha_6 S^j) \quad (4)$$

As an example the ranking parameter ($K_i^j$) for RAT i and for service type j may be estimated by using a particular expression:

$$K_i^j = \alpha_1 R_i + \alpha_2 p_i + \alpha_3 P_{Ai} + \alpha_4 F_{Pi} + \alpha_5 T_{Di} + \alpha_6 S^j \quad (5)$$

Where $\alpha_1$, $\alpha_2$, $\alpha_3$, $\alpha_4$, $\alpha_5$ and $\alpha_6$ are suitable weighted factors; $S^j$ represents the service type.

The expression in (4) or the specific function in (5) may be used to determine the ranking parameter for each RAT for a given service type parameter.

Figure 9:
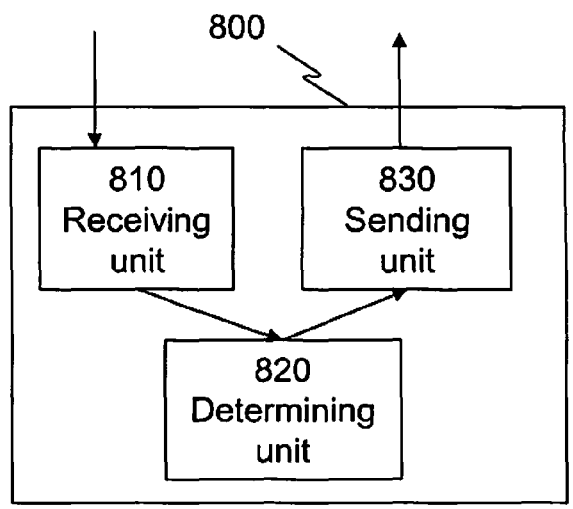
FIG. 9 shows a schematic block diagram of an embodiment of the arrangement in the radio communication network node for determining a ranking parameter for a radio access technology.

In FIG. 9, there is shown a schematic block diagram of an embodiment of the arrangement 800 in the radio communication network node 101, 102, 110 for determining a ranking parameter for a radio access technology. The ranking parameter indicates a radio access technology for which transmission is the least restricted due to a critical area. The arrangement 800 comprises a determining unit 820 configured to determine the ranking parameter based on a third set of control parameters. Optionally, the arrangement 800 comprises a receiving unit 810 and a sending unit 830. The third set of control parameters comprises one or more of the following parameters

- at least one radio access technology parameter indicating a radio access technology for which operation of the mobile terminal 102 is restricted,
- at least one data rate parameter indicating a maximum data rate at which the mobile terminal 102 is allowed to transmit,
- at least one transport block size parameter indicating at least one transport block size, which the mobile terminal 102 is allowed to use in an uplink transmission,
- at least one modulation scheme parameter indicating at least one modulation scheme, which the mobile terminal 102 is allowed to use in an uplink transmission,
- an activation probability parameter indicating a probability with which the mobile terminal 102 is allowed to activate its transmitter,
- a transmission power parameter indicating a maximum allowed transmission power,
- a frequency band parameter indicating an allowed frequency band,
- a carrier parameter indicating an allowed sub-set of carrier frequencies,
- a time period parameter indicating a time period during which the radio emission is to be reduced, and a service type parameter, indicating a type of service such as a voice, video or data service.

In some embodiments of the arrangement 800 in the radio communication network node 101, 102, 110, the radio communication network node 101, 102, 110 is a first radio network node 101, 110, such as a core network node, a radio base station node, a mobility management entity, a home subscriber system or a radio network controller node or the like.

In some embodiments of the arrangement 800 in the radio communication network node 101, 102, 110, the radio communication network node 101, 102, 110 is a first radio network node 101, 110 and the sending unit 830 is configured to send the ranking parameter to a mobile terminal 102. In this manner, the mobile terminal may use the ranking parameter for selecting a radio access technology that is allowed with the respect to the critical situation.

In some embodiments of the arrangement 800 in the radio communication network node 101, 102, 110, the radio communication network node 101, 102, 110 is a first radio network node 101, 110 and the receiving unit 810 is configured to receive a service request from the mobile terminal 102. Moreover, the determining unit 820 is configured to deny the request if resources required by the service indicated by the received service request is greater than available resources of the radio access technology indicated by the ranking parameter.

In some embodiments of the arrangement 800 in the radio communication network node 101, 102, 110, the radio communication network node 101, 102, 110 is a mobile terminal 102 and the receiving unit 810 is configured to receive the third set of control parameters from a first radio network node 101, 110, such as a core network node, a radio base station node, a mobility management entity or a radio network controller node or the like.

In some embodiments of the arrangement 800 in the radio communication network node 101, 102, 110, the radio communication network node 101, 102, 110 is a mobile terminal 102 and the mobile terminal 102 further sends a service request to the first radio network node 101, 110 by using the radio access technology associated with the ranking parameter. That is, the ranking parameter may enable the mobile terminal to attempt to access the radio access technology with least restrictions applied due to a critical situation.

Figure 10:
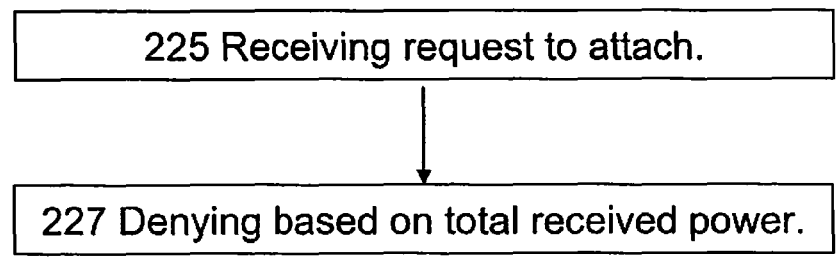
FIG. 10 shows a schematic flow chart of an embodiment of the method in the first radio network node for performing admission control.

FIG. 10 shows a schematic flow chart of an embodiment of the method in the first radio network node 101, 110 for performing admission control. The first radio network node 101, 110 may be a base station, a radio network controller, a base station controller or a core network node. A radio communication system comprises the first radio network node 101, 110 and a mobile terminal 102. The following steps may be performed.

225 In a step 225, the first radio network node 101, 110 receives a service request from the mobile terminal 102.

227 In a step 227, the first radio network node 101, 110 denies the service request if total received power at the first radio network node 101, 110 exceeds a predetermined threshold, the total received power comprising an aggregated received power from mobile terminals 102 attached to the first radio network node 101, 110 and, optionally, total received noise. The predetermined threshold is based on conditions defined by the critical area.

Figure 11:
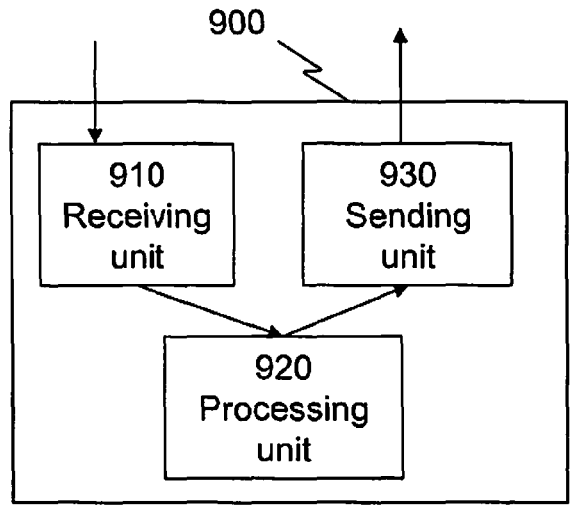
FIG. 11 shows a schematic block diagram of a generic embodiment of the arrangement in the first radio network node for performing admission control.

FIG. 11 shows a schematic block diagram of a generic embodiment of the arrangement in the first radio network node for performing admission control. Now a specific embodiment will be described with reference to FIG. 11. In the Figure, there is shown an arrangement 900 in a first radio network node 101, 110 for performing admission control. A radio communication system 100 (as shown in FIG. 1) comprises the first radio network node 101, 110 and a mobile terminal 102. The arrangement 900 comprises a receiving unit 910 configured to receive a service request from the mobile terminal 102, and a processing unit 920 configured to deny the service request if total received power at the first radio network node 101, 110 exceeds a predetermined threshold, the total received power comprising an aggregated received power from mobile terminals 102 attached to the first radio network node 101, 110. The predetermined threshold is based on conditions defined by the critical area. Optionally, the arrangement 900 comprises a sending unit 930.

Figure 12:
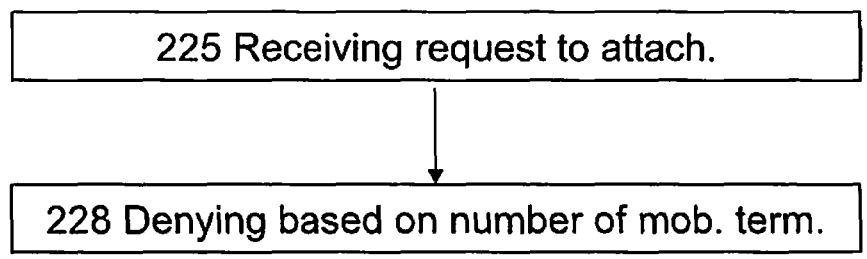
FIG. 12 shows a schematic flow chart of another embodiment of the method in the first radio network node for performing admission control.

FIG. 12 shows a schematic flow chart of another embodiment of the method in the first radio network node 101, 110 for performing admission control. A radio communication system comprises the first radio network node 101, 110 and a mobile terminal 102. The following steps may be performed.

225 In a step 225, the first radio network node 101, 110 receives a service request from the mobile terminal 102.

228 In a step 228, the first radio network node 101, 110 denies the service request if an aggregated number of mobile terminals 102 attached to the first radio network node 101, 110 exceeds a predetermined number of mobile terminals. The predetermined mobile terminal number is based on conditions defined by the critical area.

Now referring to FIG. 11 again, there is shown another embodiment of the arrangement 900 in a first radio network node 101, 110 for performing admission control. A radio communication system comprises the first radio network node 101, 110 and a mobile terminal 102. The arrangement 900 comprises a receiving unit 910 configured to receive a service request from the mobile terminal 102, and a processing unit 920 configured to deny the service request if an aggregated number of mobile terminals 102 attached to the first radio network node 101, 110 exceeds a predetermined mobile terminal number. The predetermined mobile terminal number is based on conditions defined by the critical area.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method in a first radio network node for controlling radio emission from a mobile terminal, wherein the mobile terminal is located in a critical area in which radio emission from the mobile terminal is to be at least partly reduced, and wherein a radio communication system comprises the first radio network node and the mobile terminal, the method comprising:
   sending a location parameter of the critical area to the mobile terminal, wherein the critical area has a geographical location and the location parameter indicates the geographical location of the critical area;
   sending a first set of control parameters to the mobile terminal, wherein the first set of control parameters comprises:
      at least one radio access technology parameter indicating a radio access technology for which operation of the mobile terminal is restricted; and
      a ranking parameter indicating a measure of restrictions applicable for the radio access technology;
      wherein the location parameter and the first set of control parameters are useable by the mobile terminal for controlling radio emission therefrom;

receiving a service request from the mobile terminal to use a service within the geographical location of the critical area;

denying the service request if resources required by the service are greater than available resources of the radio access technology; and granting the service request if resources required by the service are less than available resources of the radio access technology.

2. The method of claim 1, further comprising determining the ranking parameter based on a service type parameter indicating a type of service.

3. The method of claim 1, wherein the first set of control parameters further comprises at least one data rate parameter indicating a maximum data rate at which the mobile terminal is allowed to transmit.

4. The method of claim 1, wherein the first set of control parameters further comprises at least one transport block size parameter indicating at least one transport block size that the mobile terminal is allowed to use in an uplink transmission.

5. The method of claim 1, wherein the first set of control parameters further comprises at least one modulation scheme parameter indicating at least one modulation scheme that the mobile terminal is allowed to use in an uplink transmission.

6. The method of claim 1, wherein the first set of control parameters further comprises an activation probability parameter indicating a probability with which the mobile terminal is allowed to activate its transmitter.

7. A first radio network node configured to control radio emission from a mobile terminal, wherein the mobile terminal is located in a critical area in which radio emission from the mobile terminal is to be at least partly reduced, and wherein a radio communication system comprises the first radio network node and the mobile terminal, wherein the first radio network node comprises:

a sending circuit configured to:
send a location parameter of the critical area to the mobile terminal, wherein the critical area has a geographical location and the location parameter indicates the geographical location of the critical area;
send a first set of control parameters to the mobile terminal, wherein the first set of control parameters comprises:
at least one radio access technology parameter indicating a radio access technology for which operation of the mobile terminal is restricted; and
a ranking parameter indicating a measure of restrictions applicable for the radio access technology;
wherein the location parameter and the first set of control parameters are useable by the mobile terminal for controlling radio emission therefrom;
receive a service request from the mobile terminal to use a service within the geographical location of the critical area;
deny the service request if resources required by the service are greater than available resources of the radio access technology; and
grant the service request if resources required by the service are less than available resources of the radio access technology.

8. The first radio network node of claim 7, wherein the first radio network node is further configured to determine the ranking parameter based on a service type parameter indicating a type of service.

9. The first radio network node of claim 7, wherein the first set of control parameters further comprises at least one data rate parameter indicating a maximum data rate at which the mobile terminal is allowed to transmit.

10. The first radio network node of claim 7, wherein the first set of control parameters further comprises at least one transport block size parameter indicating at least one transport block size that the mobile terminal is allowed to use in an uplink transmission.

11. The first radio network node of claim 7, wherein the first set of control parameters further comprises at least one modulation scheme parameter indicating at least one modulation scheme that the mobile terminal is allowed to use in an uplink transmission.

12. The first radio network node of claim 7, wherein the first set of control parameters further comprises an activation probability parameter indicating a probability with which the mobile terminal is allowed to activate its transmitter.

13. A method in a mobile terminal for controlling radio emission from the mobile terminal, wherein a radio communication system comprises the mobile terminal and a first radio network node, the method comprising:

receiving a location parameter of a critical area from the first radio network node, wherein the critical area has a geographical location and the location parameter indicates the geographical location of the critical area;
receiving a first set of control parameters from the first radio network node, wherein the first set of control parameters comprises at least one radio access technology parameter indicating radio access technologies for which operation of the mobile terminal is restricted; and
receiving or determining a ranking parameter indicating which of the radio access technologies is the least restricted;
determining that a geographical location of the mobile terminal is within the critical area; and
controlling radio emission from the mobile terminal when the mobile terminal is within the critical area based on the first set of control parameters, the location parameter, and the ranking parameter.

14. The method of claim 13, wherein the ranking parameter is based on a service type parameter indicating a type of service.

15. The method of claim 13, wherein the first set of control parameters further comprises at least one data rate parameter indicating a maximum data rate at which the mobile terminal is allowed to transmit.

16. The method of claim 13, wherein the first set of control parameters further comprises at least one transport block size parameter indicating at least one transport block size that the mobile terminal is allowed to use in an uplink transmission.

17. The method of claim 13, wherein the first set of control parameters further comprises at least one modulation scheme parameter indicating at least one modulation scheme that the mobile terminal is allowed to use in an uplink transmission.

18. The method of claim 13, wherein the first set of control parameters further comprises an activation probability parameter indicating a probability with which the mobile terminal is allowed to activate its transmitter.

19. A mobile terminal configured to control radio emission from the mobile terminal, wherein a radio communication system comprises the mobile terminal and a first radio network node, the mobile terminal comprising circuitry configured as:

a receiving unit configured to:
receive a location parameter of a critical area from the first radio network node, wherein the critical area has a geographical location and the location parameter indicates the geographical location of the critical area; and receive a first set of control parameters from the first radio network node, wherein the first set of control parameters comprises at least one radio access technology parameter indicating radio access technologies for which operation of the mobile terminal is restricted; and a processing unit configured to:
- determine, or receive via the receiving unit, a ranking parameter indicating which of the radio access technologies is the least restricted;
- determine that a geographical location of the mobile terminal is within the critical area; and
- control radio emission from the mobile terminal when the mobile terminal is within the critical area based on the first set of control parameters, the location parameter, and the ranking parameter.

* * * * *

UNITED STATES PATENT AND TRADEMARK OFFICE
CERTIFICATE OF CORRECTION

PATENT NO. : 9,066,276 B2
APPLICATION NO. : 13/139754
DATED : June 23, 2015
INVENTOR(S) : Kazmi et al.

It is certified that error appears in the above-identified patent and that said Letters Patent is hereby corrected as shown below:

In the specification

Column 12, Line 34, delete "chum." and insert -- churn. --, therefor.

Column 17, Line 32, Equation (1), delete "$P_A=1-\min(I_{received}-I_{max})/I_{max}$" and insert -- $P_A=1-\min(I_{received}, I_{max})/I_{max}$ --, therefor.

Signed and Sealed this
Fifteenth Day of March, 2016

Michelle K. Lee
*Director of the United States Patent and Trademark Office*